(12) United States Patent
Drake et al.

(10) Patent No.: US 6,200,882 B1
(45) Date of Patent: Mar. 13, 2001

(54) METHOD FOR PROCESSING A PLURALITY OF MICRO-MACHINED MIRROR ASSEMBLIES

(75) Inventors: Joseph D. Drake; John H. Jerman, both of Palo Alto; Kathy J. Jackson, Cupertino, all of CA (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/191,502

(22) Filed: Nov. 13, 1998

Related U.S. Application Data
(60) Provisional application No. 60/088,733, filed on Jun. 10, 1998.

(51) Int. Cl.[7] .......................... H01L 21/46; H01L 21/78; H01L 21/301
(52) U.S. Cl. .................. 438/464; 438/3; 438/460; 438/465; 438/52; 438/53; 216/22; 216/24; 216/26
(58) Field of Search .................... 438/3, 52, 53, 438/460, 464, 465; 216/22, 24, 26

(56) References Cited

U.S. PATENT DOCUMENTS

| 4,003,059 | 1/1977 | Sugiura et al. ............... 346/108 |
| 4,055,904 | 11/1977 | Horne ............................ 34/45 |
| 4,104,808 | 8/1978 | Horne et al. .................. 34/243 R |

(List continued on next page.)

FOREIGN PATENT DOCUMENTS

| 0460890A2 | 12/1991 | (EP) . |
| 0650133A2 | 4/1995 | (EP) . |
| 0712121A2 | 5/1996 | (EP) . |
| 2016744A | 9/1979 | (GB) . |
| 59-117180 | 6/1984 | (JP) . |
| WO98/02243 | 1/1995 | (WO) . |
| WO95/13638 | 5/1995 | (WO) . |
| WO98/06095 | 2/1998 | (WO) . |
| WO98/07060 | 2/1998 | (WO) . |

OTHER PUBLICATIONS

K. Petersen, "Silicon Torsional Scanning Mirror," (Sep. 1980), IBM J. Res. Devel. vol. 24, No. 5, pp. 631–637.

T. Hirano et al., "Invar Mems Milliactuator For Hard Disk Drive Application," (Jan. 1997), IEEE, pp. 378–382.

V.P. Jaecklin et al., "Optical Microshutters And Torsional Micromirrors For Light Modulator Arrays," (Feb. 1993), IEEE, pp. 124–127.

R.M. Boysel et al., "Integration of Deformable Mirro Devices With Optical Fibers And Waveguides," (1992), SPIE vol. 1793, Int. Optics and Microstructures, pp. 34–39.

M.J. Daneman et al., "Laser–To–Fiber Coupling Module Using A Micromachined Alignment Mirror," (Mar. 1996), IEEE Photoncis Tech. Ltrs., vol. 8, No. 3, pp. 396–397.

D.L. Dickensheets et al., "Micromachined Scanning Confocal Optical Microscope," (May 15, 1996), Optics Ltrs., vol. 21, No. 10, pp. 764–765.

(List continued on next page.)

*Primary Examiner*—John F. Niebling
*Assistant Examiner*—David Zarneke
(74) *Attorney, Agent, or Firm*—Flehr Hohbach Test Albritton & Herbert LLP

(57) ABSTRACT

A method for processing a plurality of mirror assemblies formed together from a silicon wafer. The method includes the steps of exposing the mirror assemblies to an acid release etch to produce released mirror assemblies and rinsing the released mirror assemblies to produce washed mirror assemblies. The washed mirror assemblies are dried to produce dried mirror assemblies and the dried mirror assemblies are mounted onto a mounting tape to produce mounted mirror assemblies. The mounted mirror assemblies are diced or scribed to produce a plurality of separated mirror assemblies, which are separated from the mounting tape so as to produce a plurality of discrete mirror assemblies.

23 Claims, 12 Drawing Sheets

U.S. PATENT DOCUMENTS

| | | | |
|---|---|---|---|
| 4,581,529 | 4/1986 | Gordon | 250/227 |
| 4,945,400 | 7/1990 | Blonder et al. | 357/74 |
| 5,030,418 | 7/1991 | Miyata | 422/63 |
| 5,119,361 | 6/1992 | Tanabe | 369/121 |
| 5,197,050 | 3/1993 | Murakami et al. | 369/13 |
| 5,212,582 | 5/1993 | Nelson | 359/224 |
| 5,243,241 | 9/1993 | Wang | 310/36 |
| 5,253,245 | 10/1993 | Rabedeau | 369/119 |
| 5,255,260 | 10/1993 | Yamada et al. | 369/199 |
| 5,291,473 | 3/1994 | Pauli | 369/112 |
| 5,313,442 | 5/1994 | Ohtsuka et al. | 369/44.16 |
| 5,325,116 | 6/1994 | Sampsell | 346/108 |
| 5,331,454 | 7/1994 | Hornbeck | 359/224 |
| 5,411,769 | 5/1995 | Hornbeck | 427/534 |
| 5,422,872 | 6/1995 | Hsu et al. | 369/97 |
| 5,432,763 | 7/1995 | Campbell et al. | 369/44.19 |
| 5,444,566 | 8/1995 | Gale et al. | 359/291 |
| 5,448,546 | 9/1995 | Pauli | 369/112 |
| 5,491,680 | 2/1996 | Pauli | 369/112 |
| 5,504,731 | 4/1996 | Lee et al. | 369/112 |
| 5,523,878 | 6/1996 | Wallace et al. | 359/290 |
| 5,532,997 | 7/1996 | Pauli | 369/112 |
| 5,536,926 | 7/1996 | Ikeda et al. | 235/462 |
| 5,625,483 | 4/1997 | Swartz | 359/224 |
| 5,629,790 | 5/1997 | Neukermans et al. | 359/198 |
| 5,737,302 | 4/1998 | Kasahara | 369/118 |
| 5,740,150 | 4/1998 | Uchimaru et al. | 369/119 |
| 5,742,419 | 4/1998 | Dickensheets et al. | 359/201 |
| 5,828,482 | 10/1998 | Jain | 359/211 |

OTHER PUBLICATIONS

Ebata et al., "Transparent X–Ray Lithography Masks," (May, 1982), Japanese Jnl. Of Applied Physics, vol. 21, No. 5. pp. 762–767.

Fang et al., "Analysis Of A High Selectively Polysilicon Slurry For Chemical Mechanical Polishing (CMP)," (Feb. 19–20, 1998), CMP–MIC Conference, pp. 134–141.

Gill et al., "Elimination Of Extra Spring Effect At The Set–Up Anchor Of Surface–Micromachined Structure," (Mar. 1998), Jnl. Of Microelectromechanical Systems, vol. 7, No. 1, pp. 114–121.

Maboudian et al., "Critical Review: Adhesion in surface micromechanical structure," (Jan./Feb. 1997), Jnl. Vac.Sci.Technol., vol. 15, No. 1, pp. 2–20.

Nasby et al., "Application Of Chemical–Mechanical Polishing To Planarization Of Surface–Micromachined Devices," (Jun. 2–3, 1996), Solid–State Sensor and Actuator Workshop, Hilton Head, South Carolina, pp. 48–53.

"Three–Layer Polysilicon Surface Micromachining Process," Internet, http://mems.mcnc.org.

French, P.J. et al., "Optimization of a low–stress silicon nitride process for surface–micromachining applications", (1997) *Sensors And Actuators A* 58, pp. 149–157.

Petersen, K.E., "Silicon as a Mechanical Material", (May 1982) *IEEE*, vol. 70, No. 5, pp. 420–457.

METHOD FOR PROCESSING A PLURALITY OF MICRO-MACHINED MIRROR ASSEMBLIES

CROSS REFERENCE TO RELATED APPLICATIONS

This application claims priority to provisional patent application Ser. No. 60/088,733 filed Jun. 10, 1998.

BACKGROUND OF THE INVENTION

1. Field of the Invention

The present invention relates generally to data tracking, storage and retrieval systems and, more particularly, to data tracking, storage and retrieval systems that include steerable optics.

2. Background Art

In data recording and retrieval systems that use a moving media having a varying material characteristic, detectable variations from previously encoded media locations may be retrieved using reflected incident light. Such variations may also be used to provide servo control signals for following previously recorded data tracks. For example, in a magneto-optical storage system, using a magneto-optical (MO) recording material deposited on a rotating disk, information may be recorded on the disk as spatial variations of magnetic domains. During readout, the magnetic domain pattern modulates an optical polarization, and a detection system converts a resulting signal from optical to electronic format.

In one type of magneto-optical storage system, a magneto-optical head assembly is located on a linear actuator that moves the head along a radial direction of the disk to position the optical head assembly over data tracks during recording and readout. A magnetic coil is placed on a separate assembly on the head assembly to create a magnetic field that has a magnetic component in a direction perpendicular to the disk surface. A vertical magnetization vector of polarity (opposite to that of the surrounding magnetic material of the disk medium) is recorded as a mark indicating zero or a one by first focusing a beam of laser light to form an optical spot on the disk. The optical spot functions to heat the magneto-optical material to a temperature near or above a Curie point (i.e., a temperature at which the magnetization may be readily altered with an applied magnetic field). A current passed through the magnetic coil orients the spontaneous vertical magnetization vector either up or down. This orientation process occurs in the region of the optical spot where the temperature is suitably high. The orientation of the magnetization mark is preserved after the laser beam is removed. The mark is erased or overwritten if it is locally reheated to the Curie point by the laser beam while the magnetic coil creates a magnetic field in the opposite direction.

Information is read back from a particular mark on the disk by taking advantage of the magnetic Kerr effect to detect a Kerr rotation of the optical polarization that is imposed on a reflected beam by the magnetization at the mark of interest, the magnitude of the Kerr rotation being determined by the material's properties (embodied in the Kerr coefficient). The sense of the rotation is measured by established differential detection schemes as being clockwise or counter-clockwise depending on the direction of the spontaneous magnetization at the mark of interest.

Conventional magneto-optical heads, while presently providing access to magneto-optical disks with areal densities on the order of 1 Gigabit/in$^2$, tend to be based on relatively large optical assemblies which make the physical size and mass of the head rather bulky. Consequently, the speed at which conventional magneto-optical heads are mechanically moved to access new data tracks on a magneto-optical storage disk is slow. In addition, the physical size of the prior art magneto-optical heads limits the spacing between magneto-optical disks. Consequently, because the volume available in standard height disk drives is limited, magneto-optical disk drives have not been available as high capacity commercial products. For example, a commercial magneto-optical storage device presently available provides access to only one side of a 130 mm double sided 2.6 ISO gigabyte magneto-optical disk, a 40 ms disk access time, and a data transfer rate of 4.6 MB/Sec.

N. Yamada (U.S. Pat. No. 5,255,260) discloses a low-profile flying optical head for accessing an upper and lower surface of plurality of optical disks. The flying optical head disclosed by Yamada describes an actuating arm having a static (i.e., fixed relative to the arm) mirror or prism mounted thereon, for delivering light to and receiving light from a phase-change optical disk. While the static optics described by Yamada provides access to both surfaces of a plurality of phase-change optical disks contained within a fixed volume, use of the optics disclosed by Yamada is inherently limited by how small the optics can be made. Consequently, the number of optical disks that can be manufactured to function within a given volume is also limited. Another shortcoming relates to the use of static optics. This approach imposes a limit on track servo bandwidth by requiring the entire optical head assembly to move in order to change the location of a focused optical spot. This same limitation applies to the flying magneto-optical head disclosed by Murakami et al. in U.S. Pat. No. 5,197,050. In general, the larger the mass of the element used to perform fine track serving, the lower the servo bandwidth becomes and the lower the track density that can be read or written.

A method for moving a folding prism or mirror with a galvanometer actuator for fine tracking has been disclosed by C. Wang in U.S. Pat. No. 5,243,241. The galvanometer consists of bulky wire coils and a rotatable magnet mounted on a linear actuator arm attached to a flying magneto-optical head, but not mounted on the slider body itself. This design limits the tracking servo bandwidth and achievable track density due to its size and weight. Its complexity also increases the cost and difficulty of manufacture.

Miniature torsional scanning mirrors have been described, viz, "Silicon Torsional Scanning Mirror" by K. Petersen, IBM J. Res. Develop., Vol. 24, No. 5 September 1980, pp. 631–637. These mirrors are generally prepared using procedures developed in the semiconductor processing arts. Petersen describes a torsion mirror structure having a 134 $\mu$m thick silicon wafer defining a distal frame suspending a central silicon mirror element suspended by lateral torsion members therebetween. The lateral mirror dimensions are about 2.1 by 2.2 mm. The mirror is bonded over a 7 to 10 $\mu$m deep etched well in a glass slide substrate, having evaporated electrodes deposited therein. The mirror is rotationally deflected by voltages applied between the mirror and the electrodes by connecting wires. Scanning angles of up to 0.2° at a resonant operating frequency of up to 15 kHz were reported. The size and mass of the mirror limited higher operating frequency. Also, mirror distortion caused by the high dynamic torque (i.e., peak angular acceleration) at higher frequency was a limiting factor. The high mechanical Q of prior art mirrors hinders the ability to achieve precise angular deflection vs. voltage characteristics when operating in a range close to the resonant frequency. In the prior art, control of the mirror at large deflection angles becomes problematic due to the spontaneous deflection of the mirror tip to the substrate at a critical control angle when the tip of the electrostatically deflected element approaches within about ⅓ of the way down into the etched well. See "Silicon as a Mechanical Material", K. Petersen, Proceedings of the IEEE, VOL. 70, No. 5, May 1982, pp. 446–447.

Conventional multiple platter Winchester magnetic disk drives of the prior art use a set of respective suspensions and actuator arms that move in tandem as one integral unit. Because each flying magnetic head of such an integral unit is fixed relative to another flying magnetic head, during track following of a particular magnetic disk surface simultaneous track following of another magnetic disk surface is not possible.

What is needed is an improved optical head that is compact and that allows an increase in the number of storage disks that can be placed within a given volume as compared to the prior art. The improved optical head should preferably provide a high numerical aperture, a reduced head mass, a very high resonance frequency tracking servo device thus producing a very fine track servo bandwidth, and be relatively easy to manufacture. Additionally, the flying optical head should improve upon optical disk drive access times and data transfer rates and access to and use of storage disk tracks.

SUMMARY OF THE INVENTION

It is an object of the invention to provide optical data storage systems with flying heads that have a steerable micro-machined mirror with a mirror flatness (on the order of less than $\lambda/10$ where $\lambda$ is the wavelength of light of the optical path) over an expected operating temperature range.

Yet another object of the invention is to provide steerable micro-machined mirrors for retrieval of information, track following, and seeks from one data track to another data track independent of a movement of an actuator arm.

Still another object of the present invention is to provide optical data storage systems with flying heads having a steerable micro-machined mirror with an improved stiffness/mass ratio for lower mirror distortion during operation.

Yet another object of the present invention is to provide optical data storage systems with flying heads having a steerable micro-machined mirror with improved combinations of maximum mirror angular displacement, operating voltage range, mirror stiffness, mirror flatness and resonant frequency.

Still another object of the present invention is to provide optical data storage and tracking systems having increased volumetric data storage capacity.

Yet another object of the invention is to provide steerable micro-machined mirrors with greater margin between maximum angular deflection and critical control angle.

Yet another object of the invention is to provide steerable micro-machined mirrors with decreased tendency for mirror distortion due to thermal stress in a supporting frame.

Yet another object of the invention is to provide steerable micro-machined mirrors with improved electrical performance, mechanical integrity, optical quality, fabrication yield and reduced susceptibility to handling damage.

Yet another object of the invention is to provide methods for the manufacture and processing of micro-machined mirrors.

The invention includes a magneto-optical data storage system having a support body and a magneto-optical disk rotatably mounted on the support body. The disk has a planar storage surface with a plurality of concentrically disposed data tracks. An arm has a proximal extremity pivotably mounted on the support body so that the distal extremity of the arm can pivot between first and second positions relative to the storage surface. A flying magneto-optical head is mounted on the distal extremity of the arm for aerodynamic suspension adjacent the storage surface during rotation of the disk on the support body. An optical light emitter and receiver emitting a laser beam is carried by the arm. A mirror assembly of micron dimensions is carried by the head for reflecting the laser beam between the distal extremity of the optical element and the storage surface of the disk to permit the optical recording and/or reading of information on the data tracks of the storage surface. The mirror assembly has a planar base and a planar mirror spaced apart from the planar base and disposed generally parallel to the planar base. The planar mirror has first and second end portions and a longitudinal axis extending between the first and second end portions. The mirror assembly further has first and second hinge members extending along the longitudinal axis and connected to the first and second end portions and means for securing the first and second hinge members to the planar base. The mirror is rockable between first and second positions about the longitudinal axis relative to the planar base and at least a portion of the mirror is of a conductive material. The mirror assembly has first and second spaced-apart electrodes carried by the planar base for driving the mirror between the first and second positions.

The invention further includes a method for manufacturing a magneto-optical data storage system. The method includes the steps of providing a support surface and rotatably mounting a magneto-optical disk having a planar storage surface with a plurality of concentrically disposed data tracks onto the support surface. A proximal extremity of an arm is pivotably mounted on the support surface so that a distal extremity of the arm pivots between first and second positions relative to the storage surface. An optical light emitter and receiver emitting a laser beam is carried by the distal extremity of the arm. A flying magneto-optical head is mounted on the distal extremity of the arm. At least one layer of a dielectric material is deposited on a relatively thick layer of silicon to create a planar base. First and second spaced-apart electrodes are created from a layer of a conductive material deposited on the planar base. A mirror platform having first and second end portions and a longitudinal axis extending between the first and second end portions is formed from an upper layer of material spaced apart from the planar base. The mirror platform is spaced above the first and second electrodes. First and second hinge members extending along the longitudinal axis and connected to the first and second end portions of the mirror platform are made. A layer of a reflective material is placed on the mirror platform. The first and second hinge members are secured to the planar base to create a mirror assembly and the mirror assembly is attached to the head. The first and second drive electrodes can be used to rock the mirror platform about the longitudinal axis between first and second positions relative to the planar base for reflecting the laser beam between the optical light emitter and receiver and the storage surface of the magneto-optical disk so as to permit the optical recording and/or reading of information on the storage surface.

The invention also includes a method for processing a plurality of mirror assemblies formed together from a silicon wafer. Such method includes the steps of exposing the mirror assemblies to an acid release etch to produce released mirror assemblies and rinsing the released mirror assemblies to produce washed mirror assemblies. The washed mirror assemblies are dried to produce dried mirror assemblies and the dried mirror assemblies are mounted onto a mounting tape to produce mounted mirror assemblies. The mounted mirror assemblies are diced or scribed to produce a plurality of separated mirror assemblies, which are separated from the mounting tape so as to produce a plurality of discrete mirror assemblies.

BRIEF DESCRIPTION OF THE DRAWINGS

For a further understanding of the objects and advantages of the present invention, reference should be had to the following detailed description, taken in conjunction with the accompanying drawings, in which like parts are given like reference numerals. The vertical scale of FIGS. 5–17, where shown, has been exaggerated to facilitate understanding of the drawings.

DETAILED DESCRIPTION OF A PREFERRED EMBODIMENT OF THE INVENTION

Figure 1:
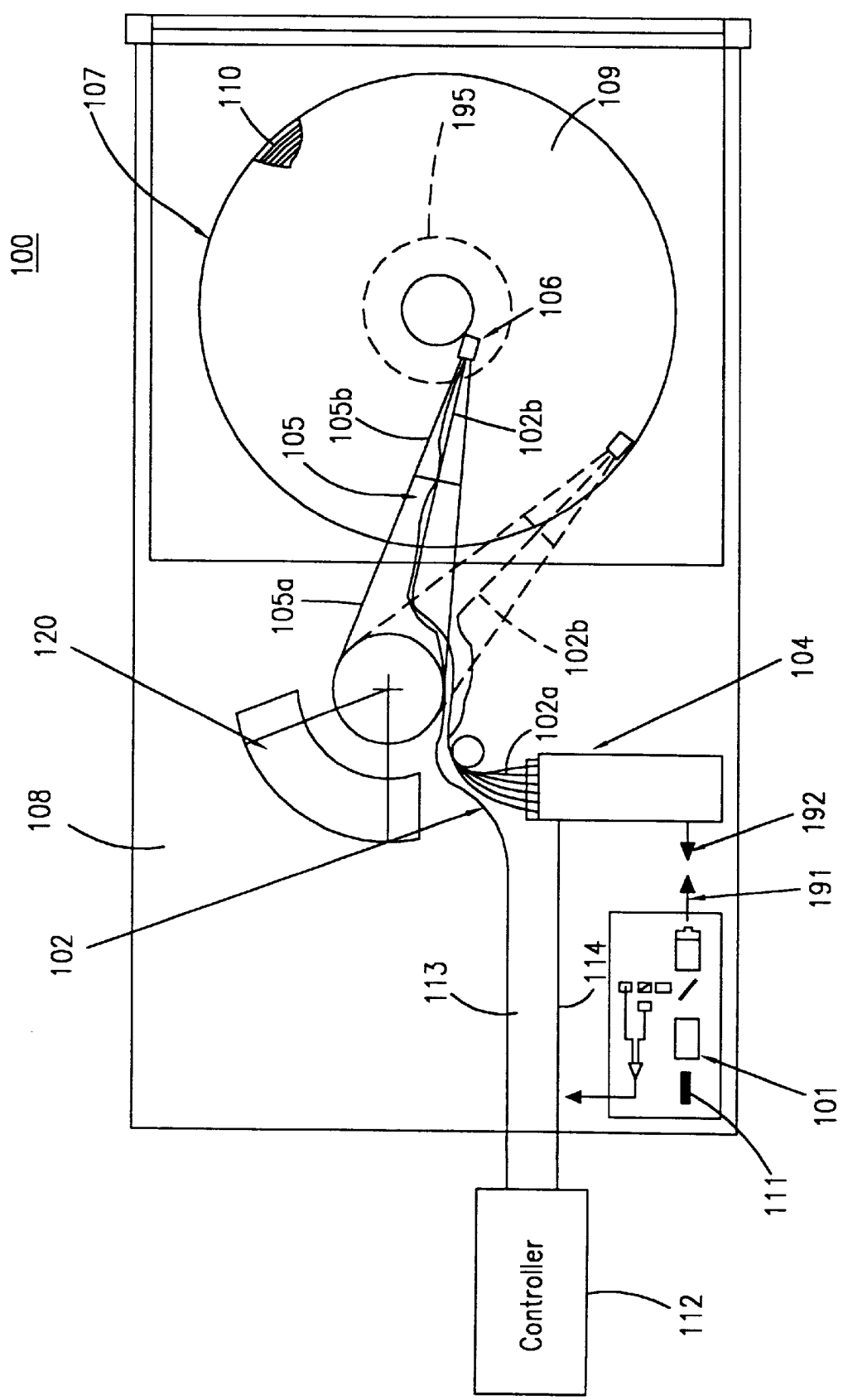
FIG. 1 is a top plan view, somewhat schematic, of one preferred embodiment of a magneto-optical storage system of the present invention.

Referring in detail now to the drawings wherein similar parts of the invention are identified by like reference numerals, there is seen in FIG. 1 a diagram showing a magneto-optical data storage and retrieval system. In a preferred embodiment, magneto-optical (MO) data storage and retrieval system 100 includes a set of Winchester-type flying heads 106 that are adapted for use with a set of double-sided magneto-optical disks 107, one flying head for each MO disk surface. MO disks 107 are rotatably carried in a stack by a support body 108 and for simplicity only one of the disks 107 is shown in FIG. 1. In a preferred embodiment, a set of six disks 107 are provided in a stack. Each side of a disk 107 has a planar storage surface 109 provided with a plurality of concentrically disposed data tracks 110 thereon. For simplicity, only several of the data tracks 110 are shown in FIG. 1 and have been enlarged relative to the size of disk 107 for permitting visualization thereof.

The set of flying heads or flying MO heads 106 are coupled to a rotary actuator magnet and coil assembly 120 by an actuator arm 105 so as to be positioned over the respective planar storage surfaces 109 of the MO disks 107. Each arm 105 has a rigid proximal extremity 105a pivotably mounted on support body 108 so as to permit a distal extremity or flexible suspension 105b to pivot between a first position, shown in solid lines in FIG. 1, to a second position spaced apart from the first position, shown in dashed lines in FIG. 1. It should be appreciated that the two positions shown in FIG. 1 are merely exemplary and that arms 105 are movable to any number of other positions relative to support body 108. The flying heads 106 are mounted to suspensions 105b of the arms 105.

In operation, the set of MO disks 107 are rotated by a spindle motor 195 so as to generate aerodynamic lift forces between the set of flying MO heads 106 and so as to maintain the set of flying MO heads 106 in a flying condition adjacent the respective storage surface 109. More specifically, each flying head is less than or equal to approximately 15 micro-inches above the respective upper or lower surface 109 of the set of MO disks 107. The lift forces are opposed by equal and opposite spring forces applied by the set of suspensions 105b. During non-operation, the set of flying heads 106 are maintained statically in a storage condition or position, not shown, away from the surfaces of the set of MO disks 107.

System 100 further includes a laser-optics assembly 101 and an optical switch 104 mounted on support body 108 and a set of single-mode polarization maintaining (PM) optical element or fibers 102 carried by the arms 105. Optical fibers 102 are included in the optical light emitter and receiver carried by the suspensions 105b of arms 105. In the exemplary embodiment, each of the set of single-mode PM optical fibers 102 has a proximal extremity 102a coupled to optical switch 104 and a distal extremity respectively coupled through a respective one of the set of actuator arms 105 and suspensions 105b to a respective one of the set of flying heads 106 for transmitting laser beams 191,192 between support body 108 and flying heads 106. Assembly 101 has a suitable laser source 111 such as a linearly polarized laser source, that is preferably a Fabry-Perot or a distributed feed-back (DFB)laser source, for producing an outgoing laser beam 191. Laser source 111 is selected to operate within a range of 635–685 nanometers, however a laser source of other wavelengths could also be used. Use of the optical switch 104, the set of flying heads 106, and the set of single-mode PM optical fibers 102 is described in commonly assigned U.S. patent application Ser. No. 08/844, 208 filed Apr. 18, 1997, the entire contents of which are incorporated herein by this reference. A controller 112 is electrically coupled to optical switch 104 by means of wires 113 for providing electrical command signals to the optical switch. The controller 112 is electrically coupled to optical switch 104 by means of wires 114.

Figure 2:
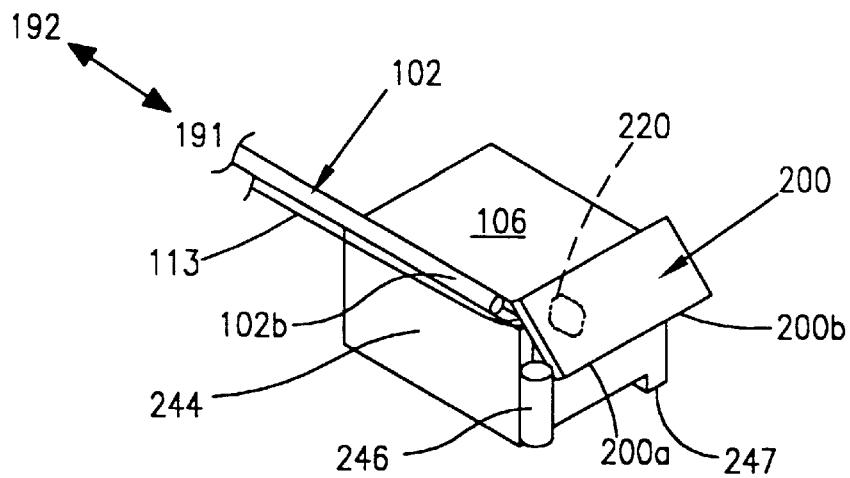
FIG. 2 is an isometric view of a magneto-optical system slider head of the magneto-optical storage system of FIG. 1 having one embodiment of a steerable micro-machined mirror assembly mounted thereon.
Figure 3:
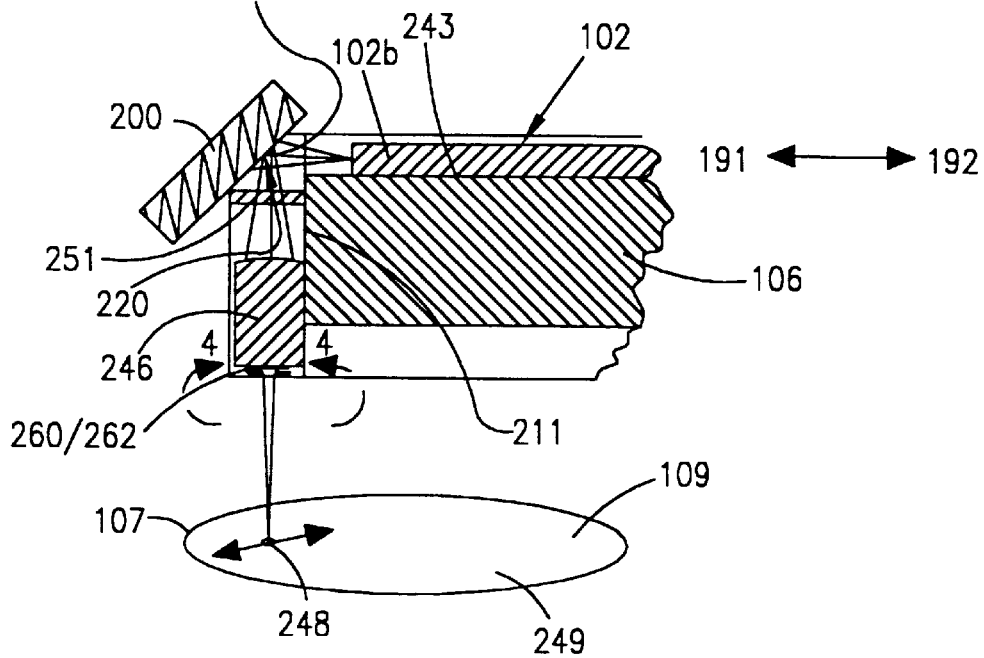
FIG. 3 is a cross-sectional view of the magneto-optical system slider head of FIG. 2.
Figure 4:
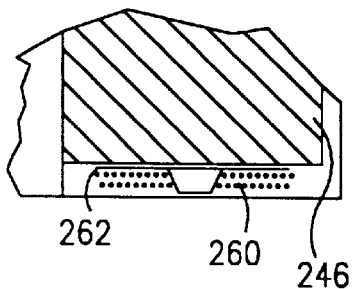
FIG. 4 is an enlarged cross-sectional view of the magneto-optical system slider head of FIG. 2 taken along the line 4—4 of FIG. 3.

Each of the flying heads 106 includes a slider body 244, an air bearing surface 247, a quarter-wave plate 251, a surface micro-machined steerable mirror assembly ($\mu$MM) 200, objective optics 246, a magnetic coil 260 and a yoke 262 (see FIGS. 2–4). The flying head 106 and the slider body 244 are dimensioned to accommodate the working distances between the objective optics 246, the single-mode PM optical fiber 102 and the reflective substrate or mirror assembly 200. Although slider body 244 may include industry standard "mini", "micro", "nano", or "pico" sliders, alternatively dimensioned slider bodies 244 may also be used, as determined by the aforementioned dimensional constraints of the elements used with the flying MO head 106. Accordingly, in the preferred embodiment, the slider body 244 comprises a mini slider height (889 um) and a planar footprint area corresponding to that of a nano slider (1600×2032 um).

The single-mode PM optical fiber 102 is coupled to the slider body 244 along an axial cutout 243 and the objective optics 246 is coupled to the slider body 244 along a vertical corner cutout 211. Although in the preferred embodiment the axial cutout 243 is located along a periphery of the slider body and the vertical cutout 211 is located at a corner of the slider body 244, the axial cutout 243 and the vertical cutout 211 may be located at other positions on the flying head 106, for example between the periphery and a central axis or alternatively along the central axis itself. Those skilled in the art will recognize that positioning the optical fiber 102 and the objective optics 246 at other than along a central axis may function to affect a center of mass of the magneto-optical head 106 and thus its flying dynamics. Accordingly, the point of attachment of the flying MO head 106 to the suspension may require adjustment to compensate for off-center changes in the center of mass of the magneto-optical head 106. Preferably, the cutouts 243 and 211 may be designed as channels, v-grooves or any other suitable configuration for coupling and aligning the single-mode optical fiber 102 and objective optics 246 to the flying head 106.

Mirror assembly 200 is shown in FIG. 2 attached to slider body 244. The mirror assembly includes a small reflective mirror 220, shown in FIG. 2 on a side of the mirror assembly 200 opposite to that which is visible and thus illustrated in dashed lines. In the preferred embodiment, outgoing laser beam 191 and incoming or return laser beam 192 traverse an optical path to and from the surface recording layer 249 on surface 109 of the MO disk 107 that includes the single-mode PM optical fiber 102, the mirror assembly 200, the quarter-wave plate 251 and the objective optics 246. The outgoing laser beam 191 is emitted from optical fiber distal extremity 102b as a Gaussian beam.

During writing of information, the outgoing laser beam 191 is selectively routed by the optical switch 104 to the MO disk 107 so as to lower a coercivity of the recording/storage layer 249 by heating a selected spot of interest 248 to approximately the Curie point of the recording/storage layer 249. Preferably, the optical intensity of outgoing laser beam 191 is held constant, while a time varying vertical bias magnetic field is created by coil 260 to define a pattern of "up" or "down" magnetic domains perpendicular to the MO disk 107. This technique is known as magnetic field modulation (MFM). Subsequently, as the selected spot of interest 248 cools, information is encoded within the recording/ storage layer 249 of the respective spinning disk 107.

During readout of information, the outgoing laser beam 191 (at a lower intensity compared to writing) is selectively routed to the MO disk 107 such that at any given spot of interest 248, the Kerr effect causes (upon reflection of the outgoing laser beam 191 from the recording/storage layer 249) a reflected laser beam 192 to have a rotated polarization of either clockwise or counter clockwise sense that depends on the magnetic domain polarity at the spot of interest 248.

The aforementioned optical path is bi-directional in nature. Accordingly, the reflected laser beam 192 is received through the flying head 106 and enters the distal end 102b of the single-mode PM optical fiber 102. The reflected laser beam 192 propagates along the single-mode PM optical fiber 102 to exit at its proximal end 102a and is selectively routed by the optical switch 104 for transmission to laser-optics assembly 101 for subsequent conversion to an electrical signal.

Micro-machined mirror assembly or mirror assembly 200 has a size and shape similar to a semiconductor chip and is of micron dimensions. Mirror assembly 200 has first and second extremities or end portions 200a and 200b and has first and second parallel sides 296 and 297 forming the end surfaces of the extremities 200a and 200b and third and fourth parallel sides 298 and 299 extending between the extremities 200a and 200b (see FIG. 5). First end portion 200a is referred to as working area 200a and second end portion is referred to as slider attach area 200b herein. Mirror assembly 200 can have a length between sides 296 and 297 ranging from 500 to 3000 microns and preferably approximately 1850 microns, a width between sides 298 and 299 ranging from 300 to 1000 microns and preferably approximately 650 microns and a height between its top and bottom surfaces ranging from 75 to 600 microns and preferably approximately 175 microns.

Mirror assembly 200 has a planar base 301. Planar mirror 220 is spaced apart from and parallel to the planar base 301 and has first and second end portions 220a and 220b and a central longitudinal axis 303 extending between such end portions (see FIGS. 5, 9 and 10). The longitudinal axis 303 extends through the center of mirror 220 and perpendicular to the longitudinal axis of mirror assembly 200. Mirror further includes first and second halves symmetrically disposed on longitudinal or rotational axis 303. First and second torsional members 306 and 307 are secured to respective first and second end portions 220a and 220b of mirror 220. The torsional members or hinge members 306 and 307 each extend along longitudinal axis 303 and permit the mirror 220 to rock about longitudinal axis 303 between first and second deflected positions relative to dielectric layer 314 and planar base 301. The mirror 220 passes through its home or planar position, shown in FIG. 5, as it travels between its first and second deflected positions. Securing means, as more fully discussed below, is included within mirror assembly 200 for securing the first and second hinge members or hinges 306 and 307 to planar base 301.

Planar base 301 has a first or substrate layer 311 which serves as the rigid support for the laminar structure of mirror assembly 200. Substrate 311, as shown most clearly in FIG. 7, has the shape of a parallelepiped. Substrate 311 has a length and width which define the length and width of mirror assembly 200 and has a thickness ranging from 75 to 600 microns and preferably approximately 175 microns. The relatively thick substrate has opposite top and bottom planar surfaces 312 and 313 and can be formed from any suitable material such as silicon, quartz and other relatively high-temperature glasses. In a preferred embodiment, substrate 311 is formed from N-type silicon in wafer form.

A layer 314 formed from at least one layer of a dielectric material overlies the substrate 311 and is included in planar base 301. In one preferred embodiment of mirror assembly 200, dielectric layer 314 is a laminate which includes a thin layer of silicon dioxide 316 disposed on top surface 312 of the substrate 311 and a thin layer 317 of any suitable acid etch-resistant dielectric material, preferably a hydrofluoric acid-resistant dielectric material such as silicon nitride overlying the silicon dioxide layer 316. Each of layers 316 and 317 has a length and width equaling the length and width of substrate 311. Silicon dioxide layer 316 has a thickness ranging from 300 to 500 nanometers and preferably approximately 300 nanometers. Silicon nitride layer 317 has a thickness ranging from 200 to 300 nanometers and preferably approximately 250 nanometers. The dielectric layer 314 can alternatively consist solely of a layer of silicon nitride. In other embodiments of mirror assembly 200, the dielectric layer 314 can consist of one or more layers of any other suitable dielectric material.

Figure 7:
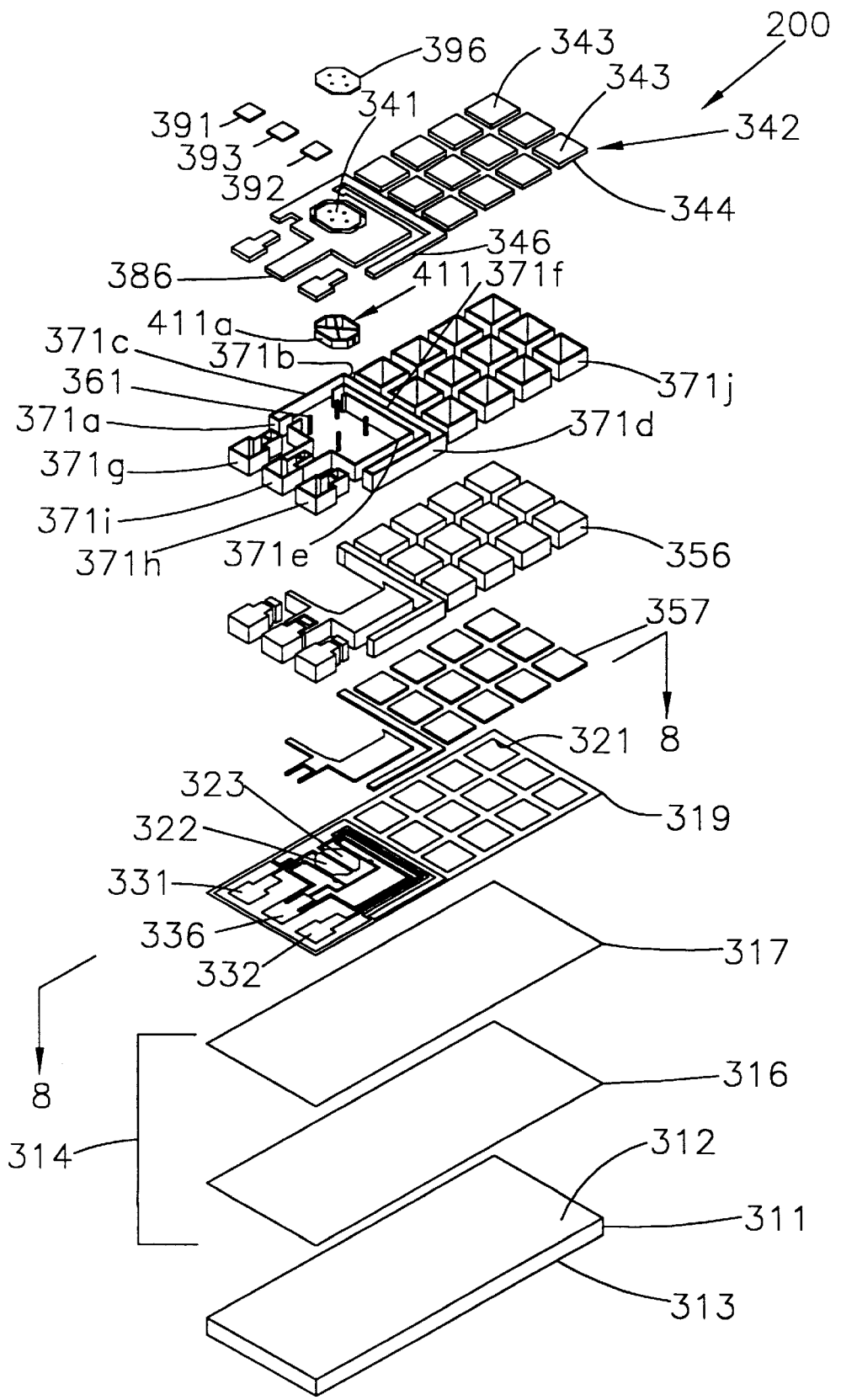
FIG. 7 is an exploded view of the micro-machined mirror assembly of FIG. 2.
Figure 8:
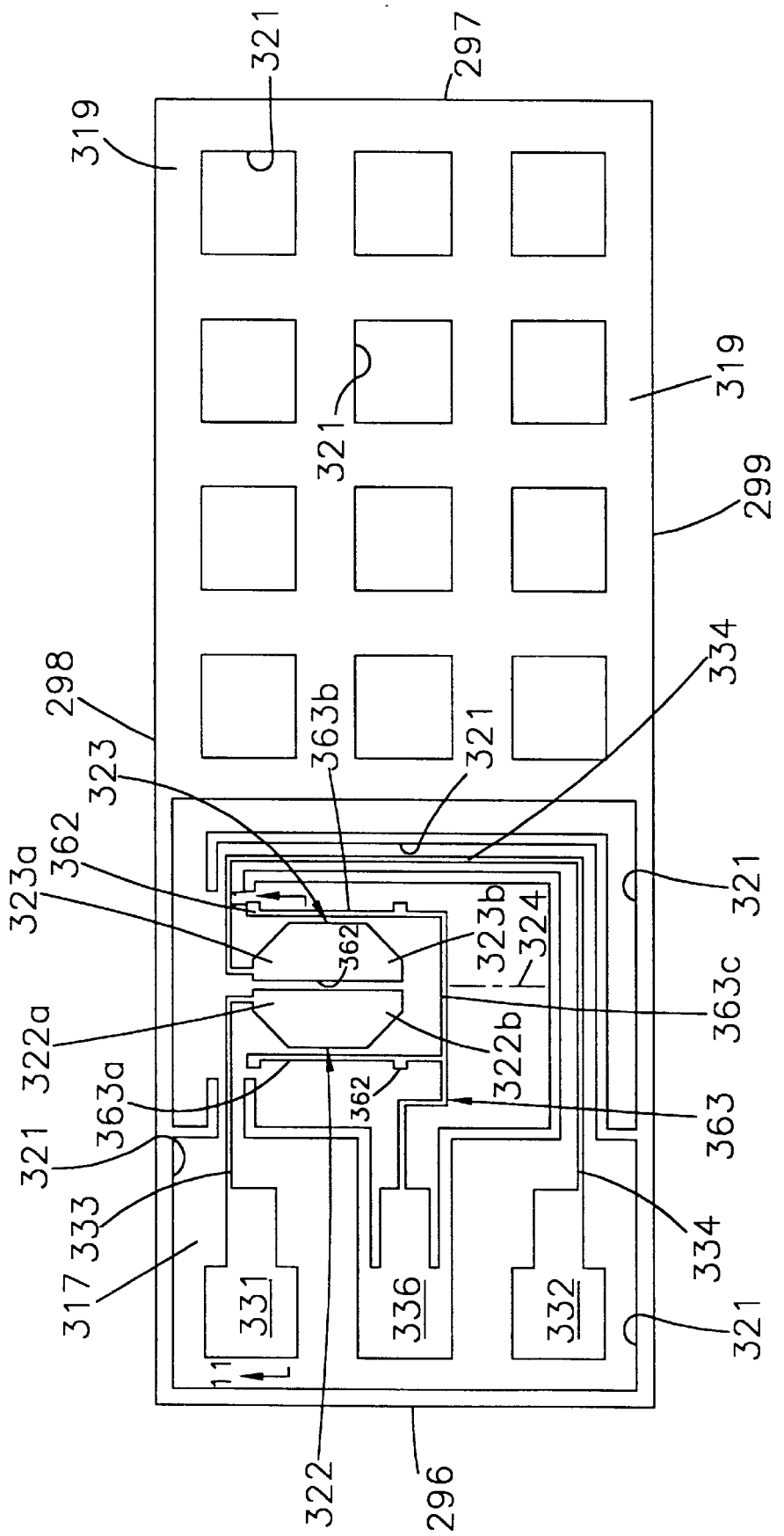
FIG. 8 is a cross-sectional view of the micro-machined mirror assembly of FIG. 2 taken along the line 8—8 of FIG. 7.

A patterned layer 319 made from any suitable conductive material such as polysilicon is disposed atop dielectric layer 314 (see FIG. 7 and 8). Planar polysilicon layer 319 has a thickness ranging from 100 to 300 nanometers and preferably approximately 250 nanometers. The layer 319 has spaces 321 between the patterned material thereof to form the various features in the layer 319. Such features include first and second drive electrodes 322 and 323 which in the finished mirror assembly 200 are spaced below mirror 220. The first and second drive or electrostatic electrodes 321 and 322 are symmetrically disposed about a central longitudinal axis 324 (see FIGS. 8 and 9). Longitudinal axis 303 of mirror 220 and longitudinal axis 324 of drive electrodes 321 and 322 are disposed in a plane extending perpendicular to the longitudinal axis of mirror assembly 200. First drive electrode 322 has first and second end portions 322a and 322b and second drive electrode 323 has first and second end portions 323a and 323b (see FIG. 8). First end portions 322a and 323a are nearest third side 298 of the mirror assembly 200. The electrodes 322 and 323 are separated by a space 326 in polysilicon layer 319, included in the spaces 321 in layer 319, which is centered on longitudinal axis 324. First and second electrodes 322 and 323 have an aggregate shape in plan which is octagonal and approximates the octagonal shape of mirror 220. Such aggregate octagonal shape of drive electrode 322 and 323 is smaller than the octagonal shape of mirror 220.

First and second conductive pads 331 and 332 and first and second conductive traces 333 and 334 are formed by polysilicon layer 319 on planar base 301. First conductive pad 331 is disposed adjacent the corner of first and third sides 296 and 298. Second conductive pad 332 is disposed adjacent the corner of first and fourth sides 296 and 299. First electrical trace 333 extends from first conductive pad 331 to first end portion 322a of the first drive electrode 322. Second electrical trace 334 extends from second conductive pad 332 past second end portions 322b and 323b of the drive electrodes 322 and 323 and past the outer side of second electrode 323 to second end portion 323a of the second drive electrode 323. Traces 333 and 334 approach respective end portions 322a and 323a from opposite directions to connect to the electrodes 322 and 323 adjacent central longitudinal axis 324. First conductive pad 331, trace 333 and drive electrode 322 and second conductive pad 332, trace 334 and drive electrode 323 are electrically isolated within polysilicon layer 319 from each other and the remainder of the layer 319. A third conductive pad 336 is formed by polysilicon layer 319 between first and second conductive pads 331 and 332 and adjacent first side 296.

Figure 9:
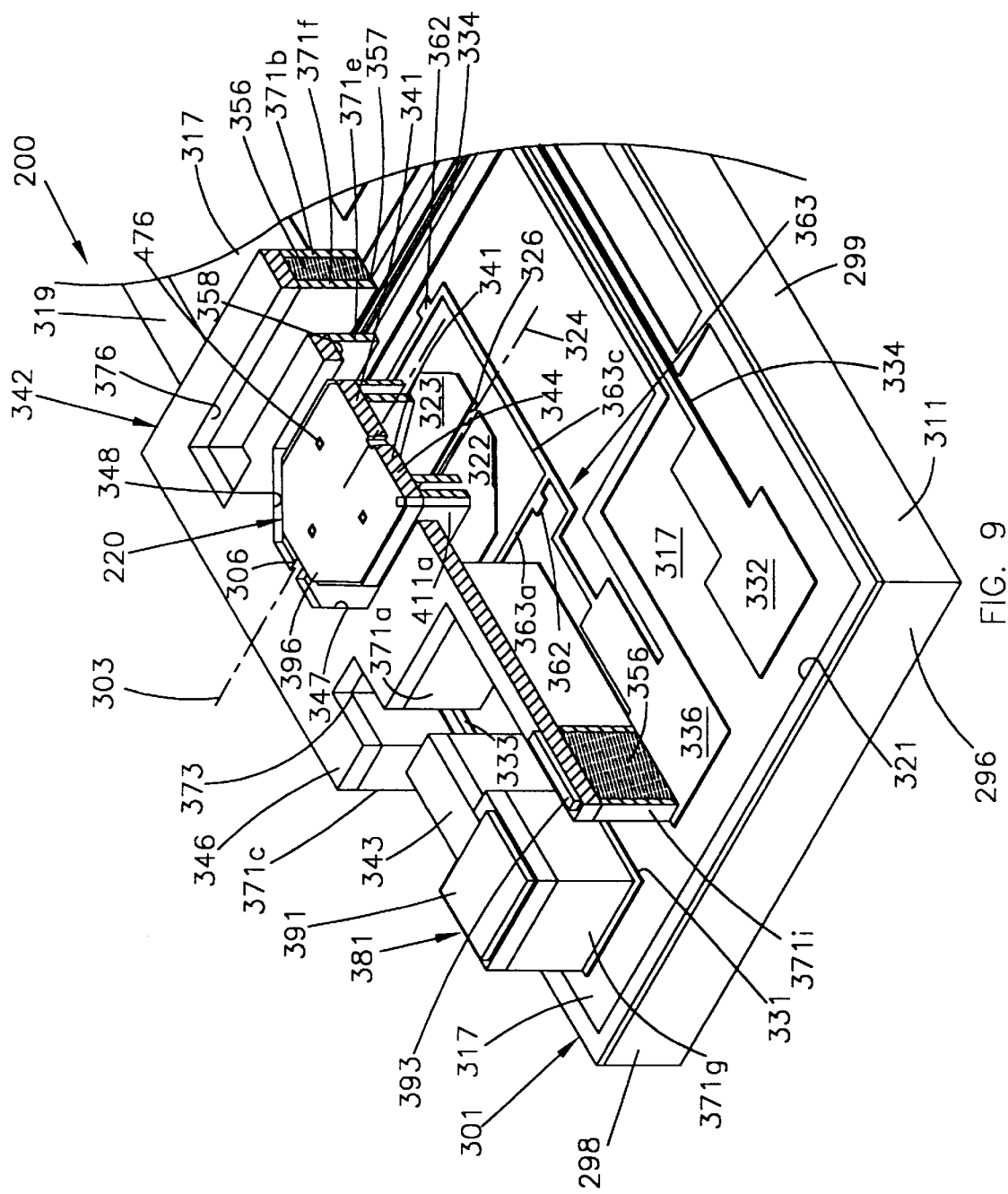
FIG. 9 is an isometric view of a portion of the micro-machined mirror assembly of FIG. 2 partially cross-sectioned along the line 9—9 of FIG. 6.
Figure 10:
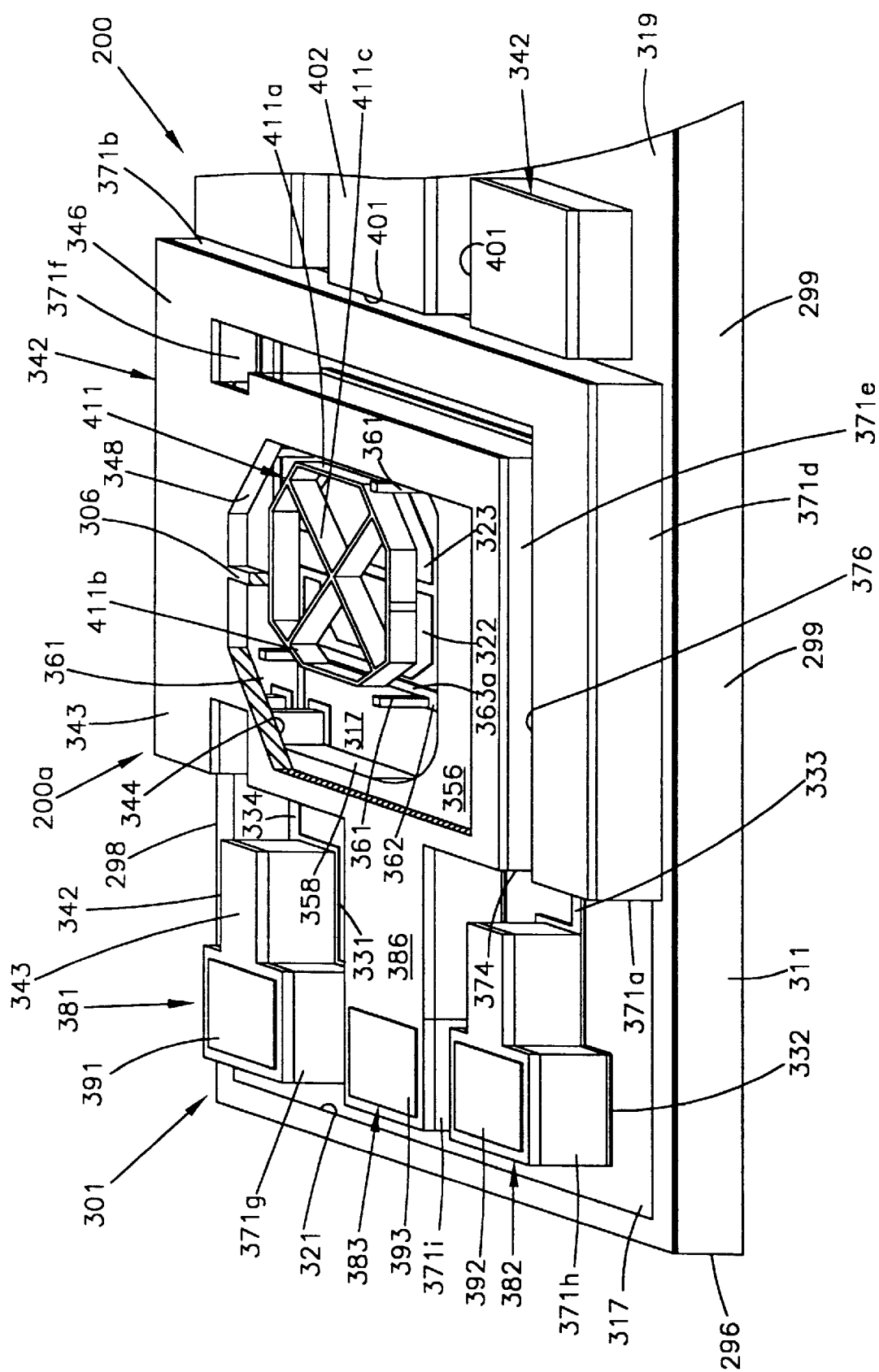
FIG. 10 is an isometric view of a portion of the micro-machined mirror assembly of FIG. 2 which has been partially cut away.
Figure 11:
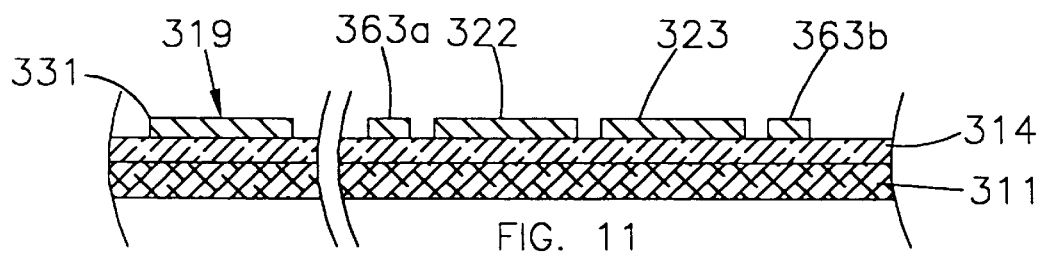
FIG. 11 is a cross-sectional view of an in-process portion of the micro-machined mirror assembly of FIG. 2, similar to the view taken along the line 11—11 of FIG. 8, illustrating a step in the manufacturing method thereof.
Figure 12:
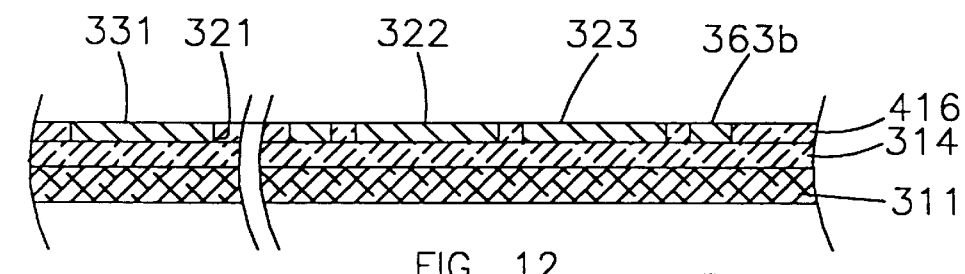
FIG. 12 is a cross-sectional view of the in-process portion of the micro-machined mirror assembly of FIG. 2 illustrating another step in the manufacturing method thereof.

Working area 200a of the mirror 220 includes a mirror platform 341 formed from an upper layer 342 of material spaced above and parallel to planar base 301 (see FIGS. 7, 9 and 10). Upper or plate layer 342 has a first or top planar surface 343 and a second or bottom planar surface 344. First and second hinges 306 and 307 are also formed from plate layer 342 and are each secured to the mirror platform 341 at one end and the inner edges of the frame 346 at the other end (see FIG. 5 and 6). In addition, the plate layer 342 has a peripheral portion or frame 346 which extends around mirror platform 341. Frame 346 is disposed in working area 200a and is provided with first and second C-shaped apertures 347 and 348 extending between surfaces 343 and 344 for forming mirror platform 341 and first and second hinges 306 and 307. Apertures 347 and 348 are symmetrically disposed about central longitudinal axis 303.

Upper layer 342 is made from any suitable conductive material such as polysilicon. The layer 342 has a thickness ranging from 1.5 to 2.5 microns and preferably approximately 2.0 microns. Frame 346 has a length measured perpendicular to mirror axis 303 ranging from 400 to 700 microns and preferably approximately 580 microns and a width ranging from 400 to 650 microns and preferably approximately 650 microns. The conductive mirror platform 341 serves as an additional or ground electrode and has a shape in plan which is substantially elliptical and more specifically octagonal. The elongated octagonal shape of mirror platform 341 and mirror 220 is at least as large as the spot, shown in phantom lines in FIG. 6, created thereon when mirror 220 is disposed at an angle of 45° in the path of laser beams 191,192. More specifically, the mirror platform has a shape which approximates the shape of such spot but is sufficiently larger to provide a safety margin around the spot of approximately 35 microns. The eight sides of mirror platform 341 join at angles of 45° to facilitate design and layout of the mirror platform of plate layer 342. The mirror platform has a length at its center along central longitudinal axis 303 ranging from 170 to 250 microns and preferably approximately 220 microns and a width at its center extending perpendicular to longitudinal axis 303 ranging from 140 to 200 microns and preferably approximately 170 microns. First and second hinges 306 and 307 each have a length measured along longitudinal 303 ranging from 15 to 60 microns and preferably approximately 25 microns and a width ranging from 3 to 8 microns and preferably approximately 4 microns.

At least one patterned layer of any suitable sacrificial material such as phosphosilicate glass (PSG) is disposed between the patterned portions of plate layer 342 and planar base 301. In the embodiment illustrated, a relative thick layer 356 of PSG and a relatively thin layer 357 of PSG are provided (see FIGS. 7 and 9). Thin PSG layer 357 is disposed in certain of the spaces 321 provided in polysilicon layer 319 and has a thickness approximating the thickness of the polysilicon layer 319. Thick PSG or spacer layer 356 is disposed atop layers 319 and 357 and has a thickness ranging from 8 to 13 microns and preferably approximately 10 microns. PSG layers 356 and 357 are removed below mirror platform 341 and a portion of frame 346 to provide a space or chamber 358 inside mirror assembly 200 (see FIGS. 9 and 10). Chamber 358 extends to polysilicon layer 319 and the exposed portions of planar base 301 in these areas. As such, mirror platform 341 is spaced apart from dielectric layer 314 and spaced above first and second drive electrodes 322 and 323. The drive electrodes are exposed to the bottom of the mirror platform 341.

Means is included within mirror assembly 200 for securing frame 346 and first and second hinges 306 and 307 interconnecting frame 346 and mirror platform 341 to planar base 301. In this regard, a plurality of posts 361 extend perpendicularly between the underside of the frame and the planar base for anchoring the plate layer 342 to the planar base 301 (see FIGS. 7 and 10). Posts 361 are each made from any suitable material and in the embodiment illustrated are made from a conductive material. More specifically, posts 361 are made from polysilicon and are secured to plate layer 342. As shown in FIG. 10, a plurality of four posts are provided. When viewed in plan, the posts 361 form a corner pattern symmetrically disposed about longitudinal axis 303 and centered on mirror 220. Each of the posts 361 rests on a landing pad 362 formed from polysilicon layer 319 and electrically coupled to ground conductive pad 336 by a conductive trace 363 also formed from the polysilicon layer 319. The pads 362 can be considered part of the posts 361, which thus extend between the plate layer 342 and the planar base 301. First and second portions 363a and 363b of ground trace 363 extend respectively along the length of the outer sides of first and second drive electrodes 322 and 323 in a direction parallel to longitudinal axis 324. A third portion 363c of the trace 363 extends perpendicularly between portions 363a and 363b adjacent second end portions 322b and 323b of the drive electrodes 322 and 323.

The means for securing or anchoring frame 346 to planar base 301 further includes a plurality of wall-like members or walls 371 extending between plate layer 342 and the planar base 301 (FIGS. 8–10). Walls 371 are each made from any suitable material such as a conductive material. More specifically, the walls 371 are made from polysilicon and are secured to plate layer 342. Walls each have a height equal to the thickness of PSG layer 356 and a thickness ranging from 4 to 14 microns, and preferably approximately 10 microns. Each of the walls sits on a patterned portion of polysilicon layer 319 (see FIGS. 8 and 9). Such patterned portions of layer 319 can be considered part of the walls 371, which thus extend between the plate layer 342 and the planar base 301.

First, second, third and fourth wall portions 371a–371d extend to the outer perimeter of frame 346 and form a box-like structure below the frame 346 (see FIGS. 7, 9 and 10). First wall portion 371a is provided with first and second openings 373 and 374 for permitting first and second traces 333 and 334 to extend through the wall 371 to the first and second drive electrodes 322 and 323. The fifth and sixth wall portions 371e and 371f extend along opposite sides of second trace 334 as the trace travels past second end portions 322b and 323b of the drive electrodes and along the outer side of second drive electrode 323. A groove or channel 376 extends through surfaces 343 and 344 of plate layer 342 to planar base 301 and has side walls formed by fifth and sixth wall portions 371e and 371f. PSG layers 356 and 357 are removed between fifth and sixth wall portions 371e and 371f. First trace 333 tunnels under frame 346 at first opening 373 and second trace 334 tunnels under the frame at the end of groove 376 and, in each case, the traces extend into chamber 358.

Plate layer 342 and walls 371 further serve to form a plurality of contact platforms for providing electrical signals to conductive or interconnect pads 331, 332 and 336. First contact platform 381 is formed by wall portion 371g and second contact platform 382 is formed by wall portion 371h. Each of the wall portions 371g and 371h extends completely around the respective contact platform and forms an enclosed area closed at the top by plate layer 342 and at the bottom by polysilicon layer 319. These enclosed areas are filled with the PSG material of layer 356. A third contact platform 383 is disposed between the first and second contact platforms 381 and 382. In this regard, plate layer 342 includes an extension 386 which is formed integral with frame 346 and extends perpendicular to first wall portion 371a toward first side 296 of the mirror assembly 200. Wall portion 371i extends from first wall portion 371a around the third contact platform and is at least partially seated on ground conductive pad 336. An internal wall is optionally provided within each of contact platforms 381–383 for increasing the contact area between the respective conductive pads 331, 332 and 336 and the plate layer 342 (see FIG. 7). PSG layers 356 and 357 do not extend between contact platforms 381–383 nor between first and second contact platforms 381 and 382 and first wall portion 371a.

A thin layer of at least one conductive material is deposited on the top of platforms 381–383 by any suitable means to provide respective first and second contact pads 391 and 392 and ground contact pad 393 thereon. Each of such contact or bond pads preferably consists of a thin layer of chromium disposed on plate layer 342 and having a thickness of approximately 10 nanometers and a thicker layer of gold having a thickness of approximately 500 nanometers placed on top of the chromium layer. Ground contact pad 393 is used to ground mirror platform 341. Since polysilicon layer 319, posts 361 and walls 371 are each formed from a conductive material, all of the posts 361 and wall portions 371a–371f and 371i joined to the mirror platform and all other walls 371 electrically coupled to such walls and posts by polysilicon layer 319 are also grounded by contact pad 393.

A thin layer 396 is placed or deposited on top of surface 343 of mirror platform 341 for providing a surface of optical quality. Layer 396 is comprised of one or more thin layers of material that in combination create high reflectivity at the wavelength of the laser light. Specifically, layer 396 includes a thin layer of chromium having a thickness of approximately 5 nanometers deposited on the top surface 343 of mirror platform 341 by any suitable means. A thicker layer of gold having a thickness of approximately 100 nanometers is deposited on top the chromium layer by any suitable means and is further included in the thin layer 396.

Figure 5:
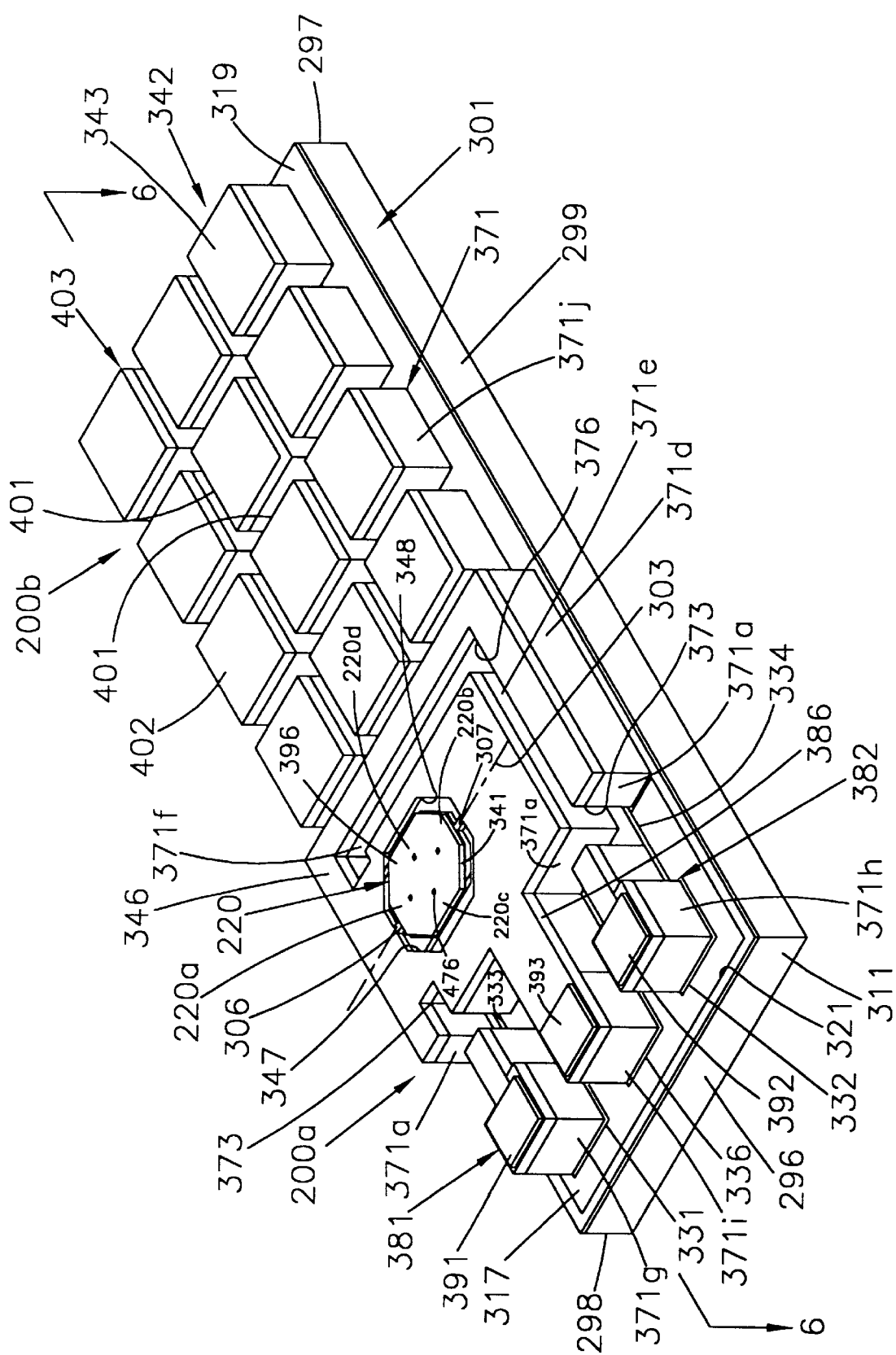
FIG. 5 is an isometric view of the micro-machined mirror assembly of FIG. 2.
Figure 6:
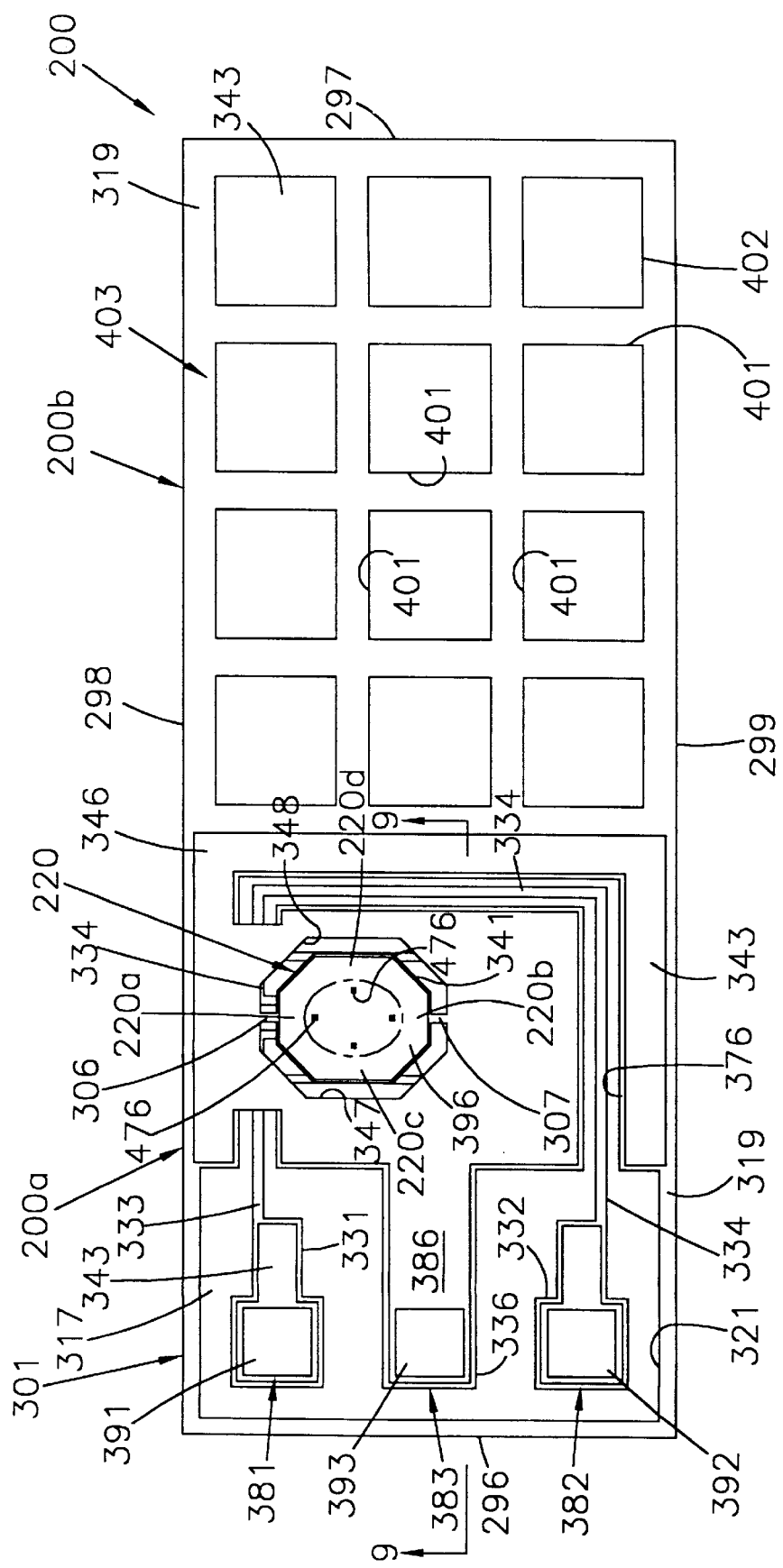
FIG. 6 is a top plan view of the micro-machined mirror assembly of FIG. 2 taken along the line 6—6 of FIG. 5.

Slider attach area 200b of mirror assemblies 200 occupies approximately one half of mirror assembly 200 (See FIGS. 5 and 6). The slider attach area has a grid of longitudinally and transversely aligned grooves or permanent channels 401 to provide a plurality of plateaus or mesas 402. Plate layer 342 has another portion or remainder portion 403 which forms the top surface of mesas 402 and is spaced apart from mirror platform 341. The mesas are further formed by wall portions 371j resting on polysilicon layer 319. Mesas 401 are each suitably shaped and dimensioned in plan and in the embodiment illustrated are each square shaped in plan with dimensions of approximately 150 microns by 150 microns. The array of mesas may consist of three longitudinally-extending rows of four mesas each. Wall portion 371d and wall portions 371j form the side walls of grooves 401 and polysilicon layer 319 forms the bottom of the grooves. The polysilicon layer 319 is removed inside each of the mesas 402. PSG layers 356 and 357 occupy the enclosed volume of the mesas 402.

A plurality of ribs 411 are secured to bottom surface 344 of mirror platform 341 for providing rigidity to mirror 220. The ribs 411 are made from any suitable material and preferably made from the same conductive material which forms posts 361 and walls 371. As such, the ribs 411 are made from polysilicon. Ribs 411 extend perpendicular to bottom surface 344 toward planar base 301 and preferably extend at least halfway between the mirror platform 341 and planar base 301. The ribs 411 have a width ranging from 2 to 6 microns and preferably approximately 4 microns and a depth ranging from 4 to 8 microns and preferably approximately 6 microns. A peripheral rib 411a extends completely around the perimeter of the octagonally-shaped mirror platform 341. One or more additional ribs can optionally be provided within the peripheral rib 411a and can include first and second diagonal ribs 411b and 411c symmetrically disposed relative to longitudinal axis 303. Ribs 411b and 411c extend at right angles to each other and cross at the center of mirror platform 341. When viewed in plan, the ribs 411b and 411c resemble a cross with end portions joined to the inside of the four diagonal portions of peripheral rib 411a. In an alternate embodiment of ribs 411 (not shown), diagonal ribs 411b and 411c do not cross at the center of the mirror platform 341 but, instead, are joined to an annular-like rib generally centered within peripheral rib 411a.

The method for manufacturing mirror assemblies 200 will now be described. Several of the steps in such method are illustrated in FIGS. 11–16. A plurality of mirror assemblies 200 are formed simultaneously in the method on a silicon wafer, a portion of which serves as the substrate 311 for each of the mirror assemblies. The silicon wafer has a starting thickness of approximately 500 microns. In an initial step, dielectric layer 314 is formed on the silicon wafer. In this regard, silicon dioxide layer 316 is formed on substrate 311 by any suitable means such as thermal oxidation. An alternate suitable means for forming layer 316 is chemical vapor deposition. Next, a silicon nitride layer 317 is formed on top of the silicon dioxide layer 316 by any suitable means such as in a low pressure chemical vapor deposition furnace.

Polysilicon layer 319 is formed by depositing a layer of polysilicon onto dielectric layer 314 by any suitable means such as low pressure chemical vapor deposition. The layer is patterned and etched in a conventional manner to remove the undesired portions of polysilicon in the layer and form spaces 321 in the layer 319. The finished polysilicon layer 319 has a pattern shown in plan in FIG. 8 and partially in cross section in FIG. 11.

It is desired that the topography of mirror platform 341 be less than 60 nanometers (λ/10) so as to meet the optical specifications of mirror assembly 200. To facilitate such planarization, a thin layer of any suitable material such as PSG is deposited on top of polysilicon layer 319 at a thickness chosen to match the thickness of polysilicon layer 319. This thin layer of PSG is photolithographically or otherwise patterned with the same mask used to pattern polysilicon layer 319 but having an opposite polarity. The thin PSG layer is then etched by any suitable means such as a hydrofluoric acid wet etch to remove the portions of the PSG layer atop polysilicon layer 319 but leave the portions of the PSG layer that are disposed in the spaces 321 of the pattern polysilicon layer 319. The resulting thin PSG layer 416 is shown in cross section with polysilicon layer 319 in FIG. 12.

Figure 13:
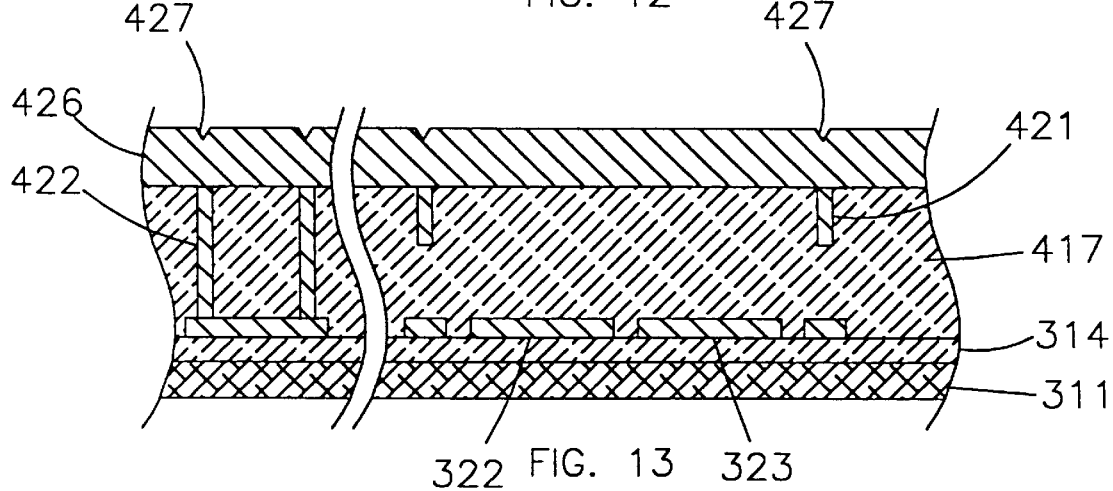
FIG. 13 is a cross-sectional view of an in-process portion of the micro-machined mirror assembly of FIG. 2 illustrating a further step in the manufacturing method thereof.

A solid layer 417 of PSG having an upper surface 418 is next formed on top of the combined layers 319 and 416 for creating PSG layer 356. A portion of the thick PSG layer 417 is shown in FIGS. 13 . 16 and the resulting PSG layer 356 is shown in FIG. 7. Thick PSG layer 417 is formed by any suitable means such as low pressure chemical vapor deposition. In one preferred method for forming layer 417, three separate depositions having respective thicknesses of approximately 3.5 microns, 3.5 microns and 3 microns are made to provide a layer 417 having an aggregate thickness of approximately 10 microns. After each deposition, the resulting structure is preferably annealed in any suitable manner for a period of approximately 0.5 hours at a temperature of 1100° C.

A plurality of grooves or trenches, holes, and other openings are formed in thick PSG layer 417 by any suitable means such as photolithographic patterning and etching. Reactive ion etching is one suitable etching procedure which can be used in this step. The trenches forming ribs 411 are completely formed and the trenches and holes forming walls 371 and posts 361 are partially formed by a first pattern and etch step which etches through PSG layer 417 to a depth necessary for forming ribs 411. Thereafter, the trenches forming ribs 411 are protected from further etching with photoresist while the anchor holes for forming posts 361 and the trenches for forming walls 371 are etched through the remainder of the PSG layer 417 down to polysilicon layer 319. In FIGS. 13–16, two portions of the trench 421 for forming peripheral rib 411a and two portions of the trench 422 for forming wall portion 371g of first contact platform 381 are shown. For simplicity, mirror 220 is shown in FIGS. 13–16 without any internal ribs such as first and second diagonal ribs 411b and 411c discussed above.

Ribs 411, walls 371 and posts 361 can now be formed by filling trenches and the other holes so formed in PSG layer 417 by any suitable material. A layer 423 of any suitable material, such as the material forming plate layer 342, can be deposited on top of PSG layer 417 simultaneously or sequentially with the material forming ribs 411, walls 371 and posts 361. In one of the methods hereof, a suitable conductive material such as polysilicon is deposited in one or more steps to form the ribs 411, walls 371, posts 361 and layer 423. Specifically, a first layer of polysilicon is deposited by any suitable means such as low pressure chemical vapor deposition to fill the trenches and holes in thick PSG layer 417 and to provide an intermediate layer 426 of polysilicon having a thickness of approximately 2.5 microns atop PSG layer 417. Such filling of trenches, such as trenches 421 and 422, and openings may result in cusps 427 in the top surface of the intermediate layer 426 (see FIG. 13).

Figure 14:
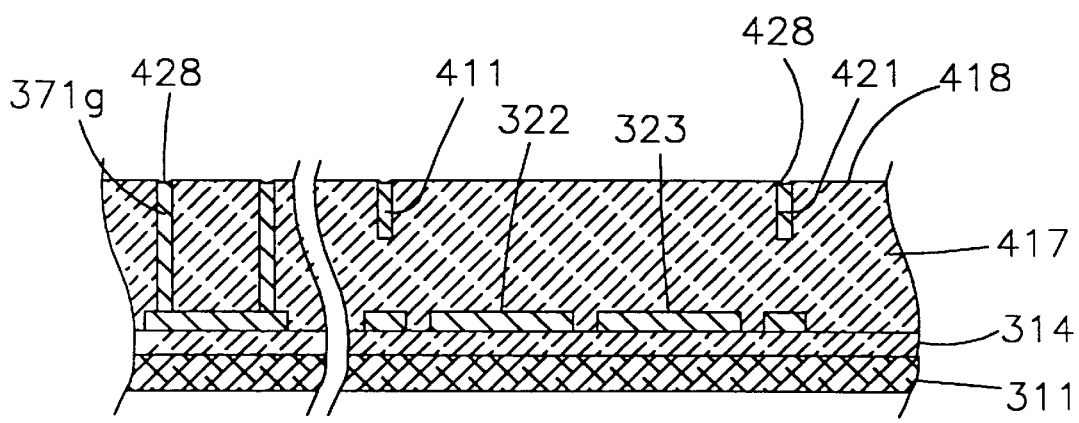
FIG. 14 is a cross-sectional view of an in-process portion of the micro-machined mirror assembly of FIG. 2 illustrating yet a further step in the manufacturing method thereof.

Substantially all of intermediate layer 426, except the portion filling the trenches and openings in PSG layer 417, is removed by any suitable means such as polishing to substantially remove cusps 427. Any suitable polishing process such as chemical mechanical polishing can be used. It is preferred that a polishing slurry which provides for the selective removal of polysilicon be utilized. Polishing slurry number SDE3000 supplied by Rodel, Inc. of Newark, Del., for example, removes polysilicon at a rate of approximately 50 to 100 times the rate at which it removes PSG and has thus been found to be acceptable. A polishing back pressure ranging from approximately 2 to 5 psi is preferred. It is important that this polishing step cease once PSG layer 417 has been reached so that removal of the PSG layer 417 is minimized. Over polishing can result in a nonplanar topography, particularly once PSG layer 417 has been exposed, due to the selective nature of the polishing slurry. Timely visual inspections of the wafer can serve to ensure against such over polishing. Cessation of polishing just before PSG layer 417 is exposed, for example, within 100 to 200 nanometers from the top of PSG layer 417, can result in enhanced planarization. At the completion of this polishing step, as shown in FIG. 14, relatively small cusps 428 may remain at the top of the substantially filled trenches and other openings in PSG layer 417.

Figure 15:
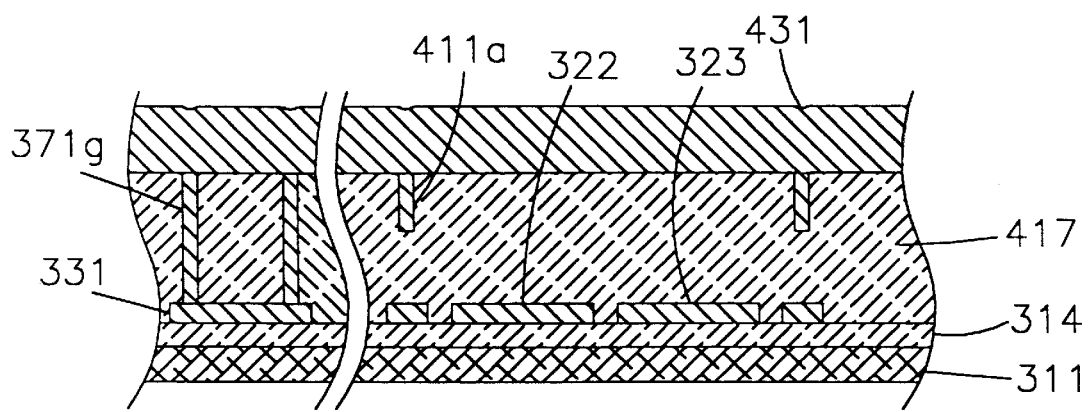
FIG. 15 is a cross-sectional view of an in-process portion of the micro-machined mirror assembly of FIG. 2 illustrating another step in the manufacturing method thereof.
Figure 16:
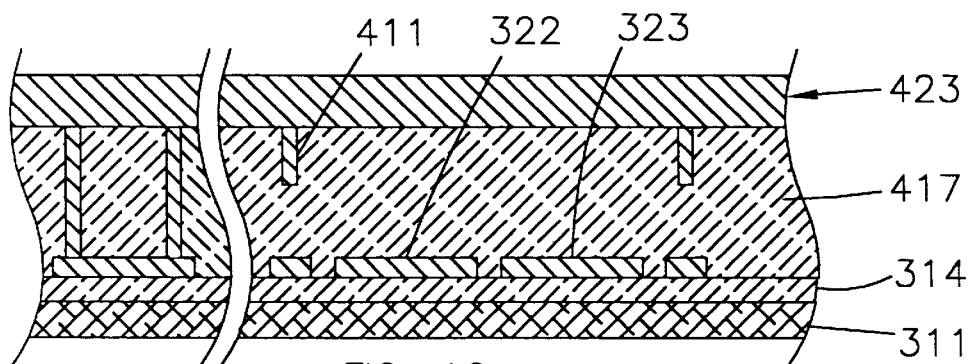
FIG. 16 is a cross-sectional view of an in-process portion of the micro-machined mirror assembly of FIG. 2 illustrating yet another step in the manufacturing method thereof.

A second or final layer 423 of polysilicon is deposited on the top of thick PSG layer 417 by any suitable means such as low pressure chemical vapor deposition (see FIG. 15). Layer 423 is preferably deposited at a thickness of approximately 2.5 microns. Polysilicon layer 423 is preferably annealed to reduce residual stresses therein. In one preferred method for so annealing layer 423, a thin layer of the material of layer 417, in this case PSG, is deposited onto polysilicon layer 423. The structure so formed is then placed in a furnace tube with a nitrogen gas ambient at 1,050° C. for at least approximately five hours. The temporary layer of PSG on top of layer 423 is stripped off after the anneal. A relatively long anneal of such duration has been found to significantly minimize stress gradients in layer 423, and more specifically, result in stress gradients of less than 1 MPa. As a result, cracking and fracture of layer 423 and specifically mirror 220, the normal products of high residual stresses, are minimized and the flatness of top service 443 of plate layer 442 enhanced. Any cusp 428 existing at the completion of the polishing step shown in FIG. 14 results in a cusp 431 on the top of layer 423, as shown in FIG. 15.

Layer 423 is polished sufficiently to reduce the depth of any such cusps 431 to less than 40 nanometers. Any suitable polishing process such as chemical mechanical polishing can be used. This final polishing step also reduces the surface roughness of layer 423 to less than 1 nanometer so as to form a top surface 343 which is of optical quality (see FIG. 16). Monitoring the removal of layer 423 is advisable so as to ensure that the desired thickness of layer 423 is attained. Reducing the polishing back pressure to approximately 1 to 2 psi reduces the removal rate thereby lessening the risk of excess polysilicon removal. A stylus-type measurement of appropriately designed topographic features patterned for example in the alignment mark areas of the wafer can be used to monitor the removal of polysilicon layer 423.

Both the intermediate and final polishing steps for forming layer 423 can be performed on any suitable chemical mechanical polishing machine such as Model 6DS-SP system or Model 6EC system, each manufactured by Strasbaugh of San Luis Obispo, Calif. The silicon wafer is attached to a polishing head that is held in proximity to a polishing pad while a polishing slurry is allowed to freely flow between the wafer and the pad. The polishing pad is adhesively affixed to a rotating horizontal stage. The polishing head undergoes planetary motion simultaneously rotating the wafer about its own axis while the head takes a circular orbit centered at the axis of rotation of the polishing stage. The polishing head provides a means by which pressure is applied to the backside of the wafer to allow for fine control of the pressure by which the wafer is held against the polishing pad. A suitable polishing slurry such as SDE3000 and a suitable polishing pad such as CR IC-1400-A4 supplied by Rodel, Inc. of Newark, Del. can be utilized.

The combined layers 319 and 416 contribute to the flatness and planarity of thick PSG layer 417 and hence layer 423. Layers 319 and 416 are not perfectly planar following the etch of the undesired portions of the thin PSG layer, but the resulting total topographic variation which translates to PSG layer 417 and layer 423 can now be easily planarized by any suitable means such as chemical mechanical polishing as part of the foregoing polishing steps.

Figure 17:
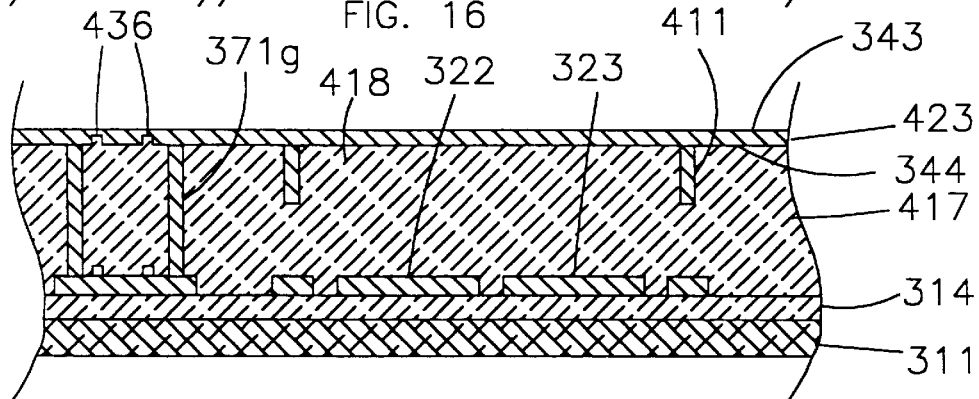
FIG. 17 is a cross-sectional view similar to FIG. 14 of an in-process portion of another embodiment of the micro-machined mirror assembly of the present invention illustrating a step in the manufacturing method thereof.

The two-step deposition and polishing step described herein can be modified and remain within the scope of the present invention. For example, a plurality of etch stop indicators 436 of the type shown in FIG. 17 can be fabricated on the top of PSG layer 417 to facilitate the cessation of the first polishing step before PSG layer 417 is reached. Etch stop indicators 436 should be strategically located, with at least some of the indicators being formed in the vicinity of mirror 220 and frame 346. Stop indicators or polishing stops or bumps 436 extend upwardly from the upper surface 418. Only two of the plurality of stop indicators 436 are shown in FIG. 17. The stop indicators 436 can be formed by any suitable means. For example, additional portions of thin PSG layer 416 can be retained atop polysilicon layer 319 instead of providing for global planarization of cooperating layers 319 and 357 as described above. During the initial polishing step, stop indicators 436 become exposed for visual inspection before the majority of PSG layer 417 is exposed. Polishing can then be stopped when the top surface of intermediate layer 426 is spaced, for example, 200 nanometers from the top of trenches 421 and 422. If the plurality of stop indicators 436 is patterned with sufficient density, these bumps 436 can serve as polishing stops to effectively end this polishing step. Such a high concentration of stop indicators 436 will slow the polishing process, aimed at the selective removal of polysilicon over PSG, thus facilitating visual inspection of the stops and subsequent termination of the polishing step.

In other modifications of the steps for forming reinforcing and anchoring structures underlying plate layer 342, a material other than polysilicon can be used in the second deposition step which forms layer 423. For example, silicon-rich silicon nitride can be used for forming layer 423. In one preferred method for forming layer 423 from silicon nitride, ammonia and dichlorosilane are combined at high temperatures in the furnace for the deposition of the silicon-rich silicon nitride layer. In general, the gas flow ratio of dichlorosilane to ammonia is in the range of 4 to 7. It is preferred that all process parameters during the formation of the silicon nitride layer not be allowed to vary significantly during the deposition nor vary from run to run. In one preferred manufacturing method, the low pressure chemical vapor deposition furnace is operated at a pressure of 200+/−5.0 mTorr, a temperature of 785+/−1.0° C., an ammonia flow rate of 26+/−0.5 sccm and a dicholorosilane flow rate of 169+/−1.0 sccm.

If the planarity of a layer 423 formed from silicon nitride has sufficient planarity, either inherently or through the use of other means such as etch stop indicators 436, the second polishing step described above may not be necessary. Silicon nitride, which as deposited is very smooth, may have a surface roughness which is small enough to render it of optical quality without the need of subsequent polishing. In addition to the foregoing, the use of a third metal in mirror 220 can have other advantages. In this regard, when ribs 411 are formed from polysilicon and mirror platform 341 is formed from silicon nitride, the higher temperature coefficient of expansion of polysilicon relative to silicon nitride permits ribs 411 to be designed to compensate for the bimetallic effect caused by the metalization, that is reflective layer 396, on top of the silicon nitride platform 341.

In a further modification of the steps for forming plate layer 342 and the anchoring and support structures adhered to the underside thereof, silicon-rich silicon nitride can be used for forming both the plate layer 342 and such underlying structures, that is, ribs 411, walls 371 and posts 361. For this method, an optimal slurry provides for the selected removal of silicon nitride relative to PSG. A suitable slurry ILD-1300 is supplied by Rodel, Inc. of Newark, Del. As discussed above, the use of silicon nitride may eliminate the need for a second polishing step by providing a top surface which is of optical quality.

The desired structures of plate layer 342 are formed from layer 423 by conventional patterning and a suitable etching technique such as reactive ion etching. In these steps, the undesired portions of layer 423 are removed to create a patterned plate layer 342 having an appearance as shown in FIGS. 6 and 7.

The bimetal laminate of reflective layer 396 is next formed on mirror platform 341. In the preferred method for forming such layer, the thin layer of chromium discussed above is deposited on top surface 343 by any suitable means such as sputter deposition. Thereafter, the thicker layer of gold discussed above is deposited atop the chromium layer by sputter deposition or any other suitable means. The resulting laminate is then patterned and wet chemical etched in a conventional manner to form reflective layer 396. In an alternate method for forming reflective layer 396, a conventional liftoff pattern is formed from a suitable photoresist on mirror platform 341. Thereafter, the layer of chromium and the layer of gold are evaporated or otherwise suitably deposited on mirror platform 341. The liftoff pattern is then removed to form a reflective layer of proper plan dimensions.

Contact pads 391–393 are formed on plate layer 342 of respective contact platforms 381–383 by initially forming a liftoff pattern on plate layer 342 for each of the contact pads. The thin layer of chromium and the thicker layer of gold, having respective thicknesses as set forth above, are evaporated or otherwise suitably formed on the plate layer. The liftoff pattern is then removed to form contact pads 391–393.

After the silicon wafer is backlapped and polished in a conventional manner to thin the wafer to approximately the 175 micron thickness of substrate 311, the plurality of mirror assemblies 200 formed together on the silicon wafer and still joined together thereby are further processed to separate the mirror assemblies from each other and to secure them to respective flying heads 106.

In one preferred method for separating mirror assemblies 200, the plurality of mirror assemblies are first exposed to a suitable acid release etch to produce released mirror assemblies. More specifically, further sacrificial portions of PSG layers 416 and 417 are removed from each mirror assembly 200 by any suitable means such as wet chemical etching by concentrated hydrofluoric acid. The materials of plate layer 342, ribs 411, walls 371, posts 361, conductive layer 319 and silicon nitride layer 317 are substantially resistant to such etch and thus not removed. The material of layers 416 and 417 must thus be sacrificial relative to the materials of plate layer 342, ribs 411, walls 371, posts 361, conductive layer 319 and silicon nitride layer 317. The portions of PSG layer encapsulated by these etch-resistant materials, such as the PSG within mesas 402, contact platforms 381–383 and other portions of enclosed walls 371, are also not removed. This etch step serves to additionally form first and second openings 373 and 374 for respective first and second traces 333 and 334, groove 376 between fifth and sixth wall portions 371e and 371f and grooves 401 between mesas 402.

The period of exposure to the acid release etch is sufficient and the sizing and configuration of holes 476, C-shaped openings 347 and 348 and trace access openings 373 and 374 are chosen so as to ensure that sufficient PSG in layers 416 and 417 is removed to free mirror 220 from planar base 301 and to form chamber 358. A plurality of optional bores or etch release holes 476 extend through top and bottom surfaces 343 and 344 of mirror platform 341 to facilitate the creation of chamber 358. In one preferred embodiment, a plurality of four holes 476 are provided in spaced-apart positions around the center of mirror platform 341. One hole 476 is provided for each of the four spaces formed by intersecting diagonal ribs 411b and 411c and peripheral rib 411a. As can be seen from FIG. 6, the holes 476 are positioned to minimize their interference with the reflection of laser beams 191,192. As such, it is preferred that no hole 476 extend through the center of the mirror. The positioning of holes 476 about the periphery of the reflection spot created on the mirror platform 341 by laser beams 191,192 does not substantially interfere with the Gaussian laser beams 191,192. The PSG material of layers 416 and 417 which adjoin first and second drive electrodes 322 and 323, first and second traces 333 and 334 and trace 363 within chamber 358 is also removed. The PSG layers 356 and 357 so formed by this etch step are shown in FIG. 7.

Plate layer 342, posts 361 and walls 371 are constructed to minimize the amount of the plate layer which is unsupported while still strategically removing portions of layer 423 in order to provide electrical isolation in the plate layer 342 where needed. In this regard, the perimeter of all structures of plate layer 342, for example mirror platform 341, frame 346 and the portions of the plate layer forming contact platforms 381–383 and mesas 402, are anchored to polysilicon layer 319 by a wall 371. The insubstantial portions of such perimeters which are not supported by walls 371 permit pivotal movement of mirror platform 341 relative to frame 346 and electrical isolation of first and second traces 333 and 334. For example, traces 333 and 334 tunnel under frame 346 at first opening 373 and the end of groove 376, respectively. The total unsupported area of plate layer 342 for forming such tunnels is kept to a minimum and the tunnels are positioned so that they are not likely to be touched during normal handling of mirror assembly 200. Posts 361 provide additional support to the inner portion of frame 346 adjoining first and second C-shaped apertures 347 and 348.

The released mirror assemblies 200 are rinsed with water and can thereafter be optionally coated with a self-assembled monolayer coating (SAM) coating to increase the hydrophobicity of the polysilicon surfaces so as to make them less susceptible to capillary attraction and adhesion. The released mirror assemblies are then rinsed in any suitable liquid such as water to produce washed mirror assemblies, which are dried in a suitable manner to produce dried mirror assemblies. In one preferred manner of drying the mirror assemblies, the mirror assemblies are first dried with a nitrogen gun and thereafter oven dried at 90° C. for a time period ranging from five to ten minutes. The dried mirror assemblies are coated with a suitable organic protectant such as a photoresist to produce coated mirror assemblies. One preferred photoresist is product number AZ1813 supplied by Hoechst Celanese of Dallas, Tex.

The dried mirror assemblies are mounted on a suitable mounting tape to produce mounted mirror assemblies. Several suitable mounting tapes are heat release tapes such as Revalpha Tape No. 3195 and Revalpha Tape No. 3198, both supplied by Nitto Denko of Osaka, Japan. Other suitable mounting tapes include ultraviolet releasable tapes, which release objects secured thereto when exposed to ultraviolet energy, and blue tape such as dicing tape Part No. 18074-5.50 supplied by Nitto Denko of Osaka, Japan. Blue tape can be stretched to facilitate separation of the mirror assemblies from each other. The mirror assemblies mounted on the mounting tape are diced by any suitable means such as by a standard semiconductor industry dicing saw to produce a plurality of diced mirror assemblies. The mounting tape holds the wafer rigidly during dicing and the photoresist or other organic protectant holds the suspended structures in the mirror assemblies 200 in place so that the cooling fluid used in the sawing operation does not damage the suspended structures.

The organic protectant is removed from the diced mirror assemblies in any suitable manner to produce cleaned mirror assemblies. Where the organic protectant is a photoresist, any suitable solvent such as acetone can be used for removing the photoresist. The acetone is thereafter removed from the mirror assemblies by an isopropanol rinse. An alternate method for removing the photoresist is by means of a plasma etch. The cleaned mirror assemblies are then separated from the mounting by any suitable means. In the case where the mounting tape is a heat release tape, the heat release tape is heated to a prescribed temperature so that the tape loses its adhesive nature. In one such method, the cleaned mirror assemblies are heated to approximately 100° C. to release the cleaned mirror assemblies from the heat release tape and thus produce a plurality of discrete mirror assemblies. The now separated mirror assemblies are optionally sorted and placed in a tray to await further assembly operations.

In another preferred method for separating the plurality of mirror assemblies 200 from the silicon wafer, the mirror assemblies are initially coated with a suitable organic protectant such as a photoresist to protect the gold surfaces thereon from contamination and thus produce coated mirror assemblies. The mirror assemblies are mounted on a suitable mounting tape and diced in the manner discussed above to produce a plurality of diced mirror assemblies. Thereafter, the organic protectant is removed from such mirror assemblies by any of the methods discussed above to produce cleaned mirror assemblies, which are exposed to a suitable acid release etch to remove the sacrificial portions of PSG layers 416 and 417. The now released mirror assemblies are rinsed with water and can thereafter be optionally coated with a self-assembled monolayer coating as discussed above. The released mirror assemblies are then rinsed in any suitable liquid such as water to produce washed mirror assemblies and thereafter dried in any suitable manner to produce dried mirror assemblies. In one preferred method, the washed mirror assemblies are dried with a nitrogen gun.

The dried mirror assemblies are separated from the mounting tape to produce a plurality of discrete mirror assemblies. When the mounting tape is a heat release tape, this separation step can include heating the dried mirror assemblies to approximately 100° C. to release the mirror assemblies from the heat release tape. The discrete mirror assemblies can be optionally sorted and further processed in the manner described above. Each of the two foregoing separation methods inhibits damage during the dicing operation as a result of device contact with the coolant fluid flow required in the dicing operation.

The plurality of mirror assemblies 200 joined together by the silicon wafer can be separated by methods which do not include dicing of the wafer. In one such preferred method, the mirror assemblies are initially exposed to an acid release etch to remove the sacrificial portions of PSG layers 416 and 417, rinsed in water or any other suitable liquid and thereafter dried in any suitable manner and preferably in the manner set forth in the first-described separating procedure. The mirror assemblies can optionally be coated with a self-assembled monolayer coating in a manner as described above. The dried mirror assemblies are thereafter mounted on any suitable mounting tape such as a heat release tape to produce mounted mirror assemblies.

In the next step of the procedure, the mounted mirror assemblies are scribed and broken apart in a conventional manner to produce a plurality of scribed mirror assemblies. Thereafter, the scribed mirror assemblies are separated from the mounting tape to produce a plurality of discrete mirror assemblies. In the method where the mounting tape is a heat release tape, the separating step includes heating the scribed mirror assemblies at approximately 100° C. to release the mirror assemblies from the heat release tape. The discrete mirror assemblies can optionally be sorted and placed in a tray for further operations.

Each of the mirror assemblies 200 is attached to a flying head 100 by adhering slider attach area 200b of the mirror assembly to angled face 202 of slider body 444. As shown most clearly in FIG. 2, where the bottom surface of substrate 311 is visible, the mirror assembly 200 is aligned on slider body 444 such that mirror 220 reflects laser beams 191,192 between extremity 102b of optical fiber 102 and objective objects 446. In the embodiment illustrated, mirror 220 reflects the laser beams through an angle of approximately 90° relative to the axis defined by the propagation direction of the impinging beam. It is preferable that laser beams 191,192 each contact mirror 220 at the center thereof. Each mirror assembly 200 can be tested before and/or after its attachment to a flying head 106. Contact pads 391–393 are electrically coupled to controller 112 by means of respective wires as shown in FIG. 2.

In operation and use of system 100, control voltages are applied by the outputs of servo controller 112 to one of first and second drive electrodes 322 and 323 to cause mirror 220 to pivot about hinges 306 and 307 in first or second opposite directions between its first and second deflected positions. The drive voltages are supplied to first and second electrodes 322 and 323 by means of first and second contact pads 391 and 392. Maximum drive voltages range from 100 to 200 volts, preferably from 120 to 150 volts and more preferably approximately 135 volts. The electrostatic force between the drive electrode 322 or 323 and the respective mirror half 220c or 220d, grounded by means of ground contact pad 393, cause the mirror 220 to pivot about rotational axis 303.

The mirror 220 pivots from its home position, in either direction about mirror axis 303, through a deflection angle ranging from 0 to 2.5° and preferably approximately 2° when traveling from its home position to its fully deflected position. The controller 112 provides drive signals to first and second drive electrodes 322 and 323 at the Nyquist rate of approximately 19 kHz. The mirror 220 has a resonant frequency ranging from 25 to 50 kHz and preferably ranging from 25 to 30 kHz. Mirror 220 is restrained during such rotation by the restoring torque of first and second hinges 306 and 307. Mirror assembly 200 reflects laser beams 191,192 between the distal extremity 102b of optical fiber 102 and the storage surface 109 of disk 107 to permit the optical recording and/or reading of information on the data tracks 110 of the storage surface 109.

Fine tracking and short seeks to a series of nearby tracks 110 may be performed by rotating the mirror 220 about rotational axis 303 so that the propagation angle of the outgoing laser beam 191 is changed before transmission to the objective optics 246. Mirror 220 thus enables the focused optical spot 248 to be moved in the radial direction of the MO disk 107 for storage and/or retrieval of information, track following, and seeks from one data track 110 to another data track. Coarse tracking may be maintained by adjusting a current to the rotary actuator magnet and coil assembly 120 (see FIG. 1). The track following signals used to follow a particular track 110 of the MO disk 107 may be derived using combined coarse and fine tracking servo techniques that are well known in the art. For example, a sampled sector servo format may be used to define tracks. The servo format may include either embossed pits stamped into the MO disk 107 or magnetic domain orientations that are read similar to data marks.

Irrespective of the movement of the set of actuator arms 105, a set of the mirror assemblies 200 of the present invention may be used to operate independently and thus permit track following and seeks so as to read and/or write information using more than one MO disk surface 109 at any given time. Independent track following and seeks using a set of concurrently operating mirror assemblies 200 preferably require a set of separate respective read channel and fine track electronics and mirror driving electronics. The small size and mass of the mirror assembly 200 contributes to the ability to design the flying head 106 with a low mass and a low profile.

In an alternate embodiment of the mirror assembly discussed above, upper layer 342 is made from a nonconductive material such as silicon-rich silicon nitride. As more fully disclosed in U.S. patent application Ser. No. 08/844,208 filed Apr. 18, 1997, at least a portion of the mirror 220 of such an embodiment would be conductive for serving as an additional or ground electrode. Such conductive portion can include reflective layer 396, which can be electrically coupled to ground bond pad 393 by electrical traces or any other suitable means. Electrical access would be required through the silicon nitride material of such a plate layer 342, such as by electrical traces extending through vias in the layer 342, to electrically couple first and second bond pads 391 and 392 to respective first and second drive electrodes 322 and 323 and to electrically ground the desired portions of polysilicon layer 319.

Figure 18:
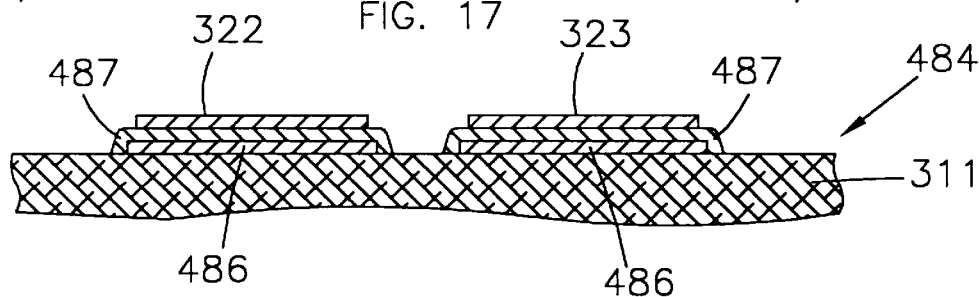
FIG. 18 is a cross-sectional view, similar to the view taken along the line 11—11 of FIG. 8, of another embodiment of the micro-machined mirror assembly of the present invention.

Another alternate embodiment of the mirror assembly of the present invention can be provided in which surface leakage currents from first and second drive electrodes 322 and 323 are further minimized. One such embodiment is shown in FIG. 18, where a portion of a mirror assembly 484 substantially similar to mirror assembly 200 is illustrated. Like reference numerals have been used to describe like components of the mirror assemblies 200 and 484. Dielectric layer 314 therein includes a silicon dioxide layer 486 disposed on substrate 311 and a silicon nitride layer 487 disposed on the top silicon dioxide layer 486. Layers 486 and 487 are substantially similar to layers 316 and 317 and are each formed on substrate 311 in substantially the same manner as discussed above with respect to the layers 316 and 317.

In an additional step from that discussed above with respect to mirror assembly 200, silicon dioxide layer 486 is patterned and etched in a conventional manner following deposition so as to provide silicon dioxide layer 486 with a portion disposed below each of the first and second drive electrodes 322 and 323 having a configuration in plan which has the shape of the respective drive electrode but is slightly larger than such drive electrode shape. Layer 486 is removed around the electrodes 322 and 323, including in the space 326 between the electrodes. Silicon nitride layer 487 is thereafter deposited on the top of silicon dioxide layer 486 and patterned and etched in a conventional manner. The portions of layer 487 underlying the respective first and second drive electrodes 322 and 323 each have a shape in plan which closely conforms to the shape of the respective drive electrode but is larger than the shape of the respective silicon dioxide portion underlying such drive electrodes. Such portions of silicon nitride layer 487 thus encapsulate such portions of the silicon dioxide layer 486 relative to substrate 311.

In operation and use, the removal of the silicon nitride layer 487 in the space 326 between first and second drive electrodes 322 and 323 inhibits surface leakage currents between the drive electrodes during operation of mirror assembly 484. Such currents are also minimized elsewhere around the drive electrodes. The encapsulation of silicon dioxide layer 486 with silicon nitride layer 487 protects the silicon dioxide layer 486 during the release etch process which removes the sacrificial portions of PSG layers 416 and 417.

Figure 19:
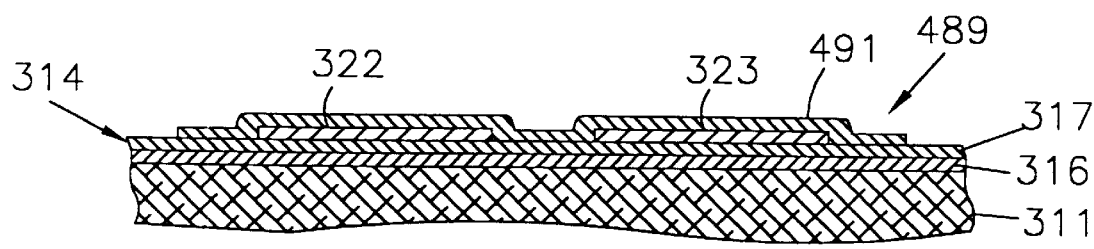
FIG. 19 is a cross-sectional view similar to FIG. 18 of a further embodiment of the micro-machined mirror assembly of the present invention.

Another embodiment for minimizing such surface leakage currents is illustrated in FIG. 19 where a portion of mirror assembly 489 is depicted. Mirror assembly 489 is substantially similar to mirror assembly 200 and like referenced numerals have been used to describe components of mirror assemblies 200 and 489. In this alternate embodiment, an additional layer 491 of any suitable dielectric material such as silicon nitride is deposited on top of first and second drive electrodes 322 and 323 after planarization thereof. Layer 491 encapsulates first and second drive electrodes 322 and 323 relative to dielectric layer 314. The layer 491 has a thickness ranging from 200 to 300 nanometers and preferably approximately 250 nanometers. In operation and use, the additional layer 491 passivates first and second drive electrodes 322 and 323 so as to contain the charge of the electrodes within a nitride encapsulation.

Figure 20:
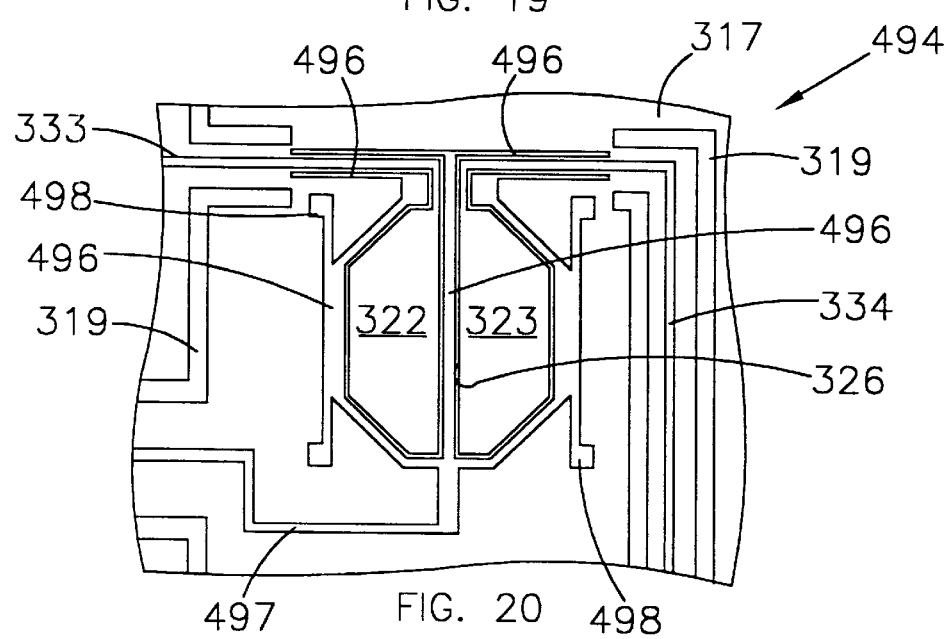
FIG. 20 is a plan view similar to FIG. 8 of yet another embodiment of the micro-machined mirror assembly of the present invention.

A further alternate embodiment for minimizing surface leakage currents from first and second drive electrodes 322 and 323 is shown in FIG. 20 where a portion of mirror assembly 494 is illustrated. Mirror assembly 494 is substantially similar to mirror assembly 200 and like reference numerals have been used to describe like components of the mirror assemblies 200 and 494. Each of the first and second drive electrodes 322 and 323 in the embodiment shown in FIG. 20 is substantially surrounded by a grounded electrode 496 which is electrically coupled to grounded conductive pad 336 by a trace 497. Electrode 496 includes landing pads 498 upon which posts 361 are supported and secured. The grounded electrode 496 has a portion which extends between the first and second drive electrodes 322 and 323 and optionally includes portions which extend alongside the first and second traces 333 and 334. Grounded electrode 496 is formed from polysilicon layer 319 in one preferred embodiment and has a thickness equal to the thickness of the polysilicon layer 319. The electrode 496 is spaced apart from first and second drive electrodes 322 and 323 and first and second traces 333 and 334 a distance of approximately 5 microns.

In operation and use, grounded electrode 496 serves to inhibit surface leakage currents on silicon nitride layer 317 by providing a ground in close proximity to the drive electrodes and traces. As such, electrode 496 serves to drain off the charge that is held on the surface of silicon nitride layer 317.

Figure 21:
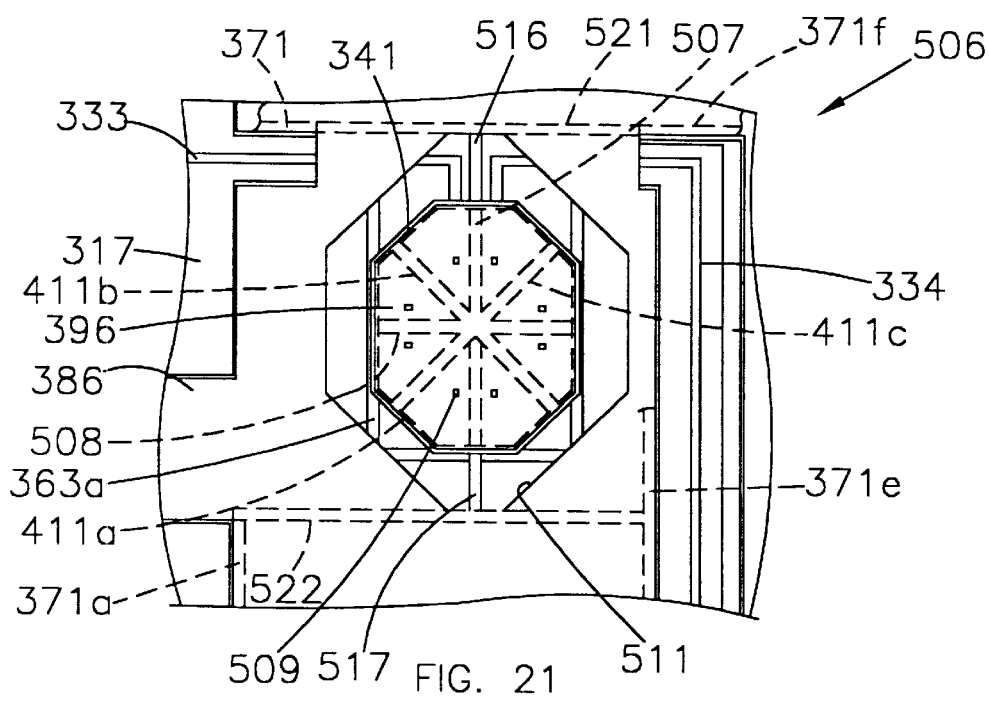
FIG. 21 is a plan view similar to FIG. 6 of a further embodiment of the micro-machined mirror assembly of the present invention.

In another embodiment of the invention, a portion of a mirror assembly 506 substantially identical to mirror assembly 200 is shown in FIG. 21. Like reference numerals have been used to describe like components of mirror assemblies 200 and 506. Mirror 220 in mirror assembly 506 has additional ribs 411 for enhancing the optical flatness of the mirror. Specifically, third and fourth ribs 507 and 508 substantially identical in composition and size to ribs 411 are provided. Third or longitudinal rib 507 extends the length of mirror 220 along central longitudinal axis 303. Fourth or transverse rib 508 extends across the center of mirror 220 perpendicular to longitudinal rib 507. As such, transverse rib 508 intersects first and second diagonal ribs 411b and 411c and longitudinal rib 507 halfway between first and second end portions 220a and 220b of the mirror 220. Longitudinal and transverse ribs 507 and 508 are formed in substantially the same manner as described above with respect to ribs 411. A plurality of optional etch release holes 509 are provided in mirror 220, one hole 509 for each space formed by adjoining ribs 411, to facilitate removal of PSG layers 416 and 417 from the underside of mirror 220 and between the mirror platform 341 and the planar base 301.

Instead of first and second C-shaped apertures 347 and 348, frame 346 is provided with an aperture 511 encircling mirror platform 341 so as to separate the mirror platform from frame 346. Aperture 511 is formed in the pattern and etch steps for creating plate layer 342 from layer 423.

Instead of first and second hinges 306 and 307 formed from plate layer 342, mirror assembly 506 has first and second torsional or hinge members 516 and 517 which are each beam-like members substantially similar to ribs 411. The hinge members or hinges 516 and 517 are formed below the plate layer 342 in substantially the same manner as discussed above with respect to ribs 411 and can be formed from the same material as the ribs 411. The hinges 516 and 517 extend from respective first and second end portions 220a and 220b along longitudinal axis 303 to frame 346. First and second hinges 516 and 517 each have a suitable width and depth and in one preferred embodiment have a width of approximately 3 microns and a depth of approximately 6 microns. First and second hinges 516 and 517 each have a length of approximately 50 microns, which is longer than the length of first and second hinges 306 and 307.

Frame 346 includes further supports for enhancing the mechanical performance of mirror assembly 220. In this regard, mirror assembly 506 has first and second wall-like members or braces 521 and 522 extending perpendicular to central longitudinal axis 303 on opposite ends of mirror 220. Braces 521 and 522 are secured to bottom surface 344 of plate layer 342 and depend perpendicular to frame 346 adjacent respective first and second hinges 516 and 517. The braces are spaced above polysilicon layer 319. Braces 521 and 522 are formed in substantially the same manner as ribs 411 and can be made from the same material as the ribs 411.

Braces 521 and 522 have a suitable width and depth and, in one embodiment, each have a width of approximately 10 microns and a depth of approximately 6 microns. First and second braces 521 and 522 are anchored to planar base 301 by securing the ends thereof to walls 371. Specifically, first brace 521 is secured at one end to first wall portion 371a and at its other end to sixth wall portion 371f. Second brace 522 is secured at one end to first wall portion 371a and at its other end to fifth wall portion 371f. First hinge 516 is secured at one end to peripheral rib 411a and at its other end to first brace 521. Similarly, second hinge 517 is secured at one end to the peripheral rib 411a and at its other end to second brace 522. Mirror assembly 506 can optionally include posts 361 for further supporting frame 346 on planar base 301.

In operation and use, additional ribs 507 and 508 provide further rigidity to mirror 220 so as to increase the flatness and thus the optical quality of the mirror. Rib hinges 516 and 517 and first and second braces 521 and 522 inhibit vertical bending of the first and second end portions 220a and 220b of the mirror 220 during the actuation period. The longer length of first and second hinges 516 and 517 and the reduction in the height of the hinges by removing plate layer 342 over substantially all of the hinges 516 and 517 permits reasonable actuation voltages to be used for driving mirror 220. First and second braces 521 and 522 are positioned close to first and second hinges 516 and 517 so as to desirably influence the hinge boundary conditions and thus inhibit vertical bending of the hinges during actuation of mirror 220.

Figure 22:
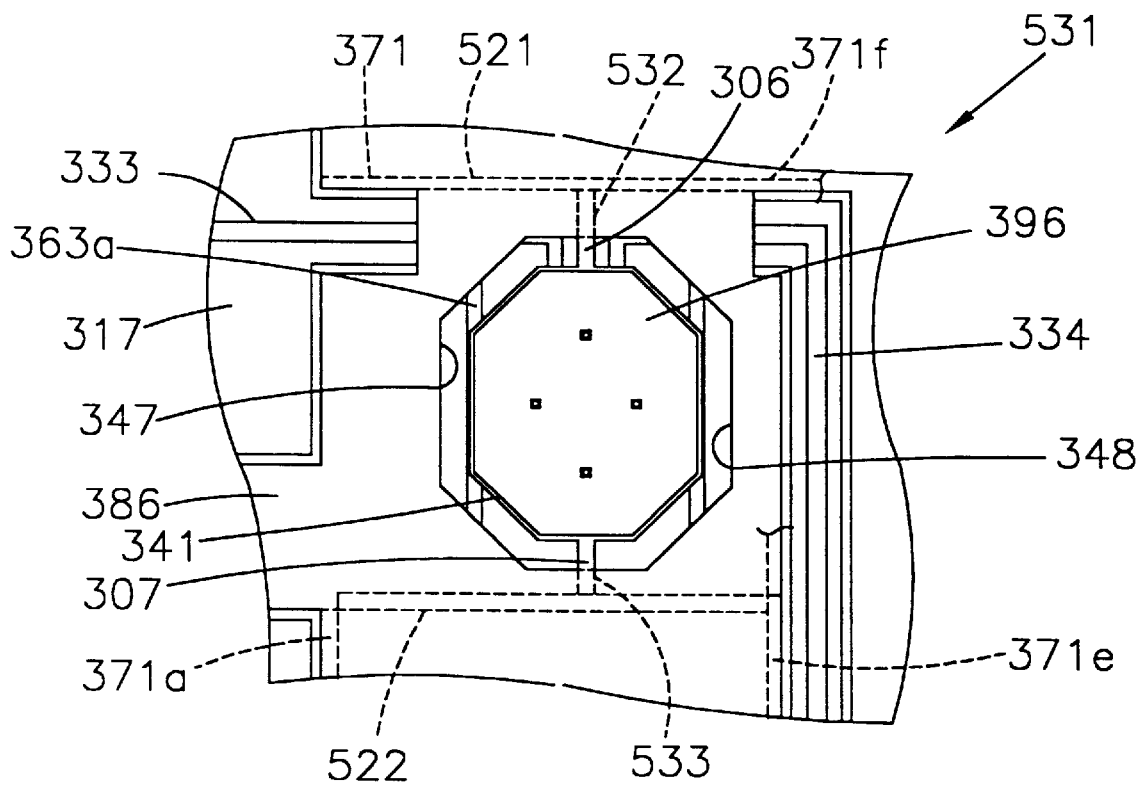
FIG. 22 is a plan view similar to FIG. 21 of a another embodiment of the micro-machined mirror assembly of the present invention.

In a further embodiment, a mirror assembly 531 substantially similar to mirror assemblies 200 and 506 is shown in FIG. 22. Like reference numerals have been used in FIG. 22 to show like components of mirror assemblies 200, 506 and 531. First and second C-shaped apertures 347 and 348 serve to form mirror platform 341 and first and second hinges 306 and 307. Mirror assembly 531 includes first and second braces 521 and 522.

Mirror assembly 531 is further provided with additional beam-like members or ribs for inhibiting vertical bending of first and second hinges 306 and 307 during actuation of mirror 220. In this regard, first and second ribs or rib clamps 532 and 533 extending along central longitudinal or rotational axis 303 at opposite ends of mirror 220 are provided. Rib clamps 532 and 533 are each formed in substantially the same manner as described above with respect to ribs 411 and can each be made from the same material as ribs 411. The first and second rib clamps 532 and 533 can have any suitable dimensions and in one preferred embodiment each have a width of approximately 5 microns, a length of approximately 15 microns and a depth or height of approximately 8 microns. First rib clamp 532 extends along the underside of frame 346 from the end of first hinge 306 to perpendicularly secure to first brace 522. Similarly, second rib clamp 533 extends along the underside of frame 346 from the end of second hinge 307 to perpendicularly secure to second brace 522. Each rib clamp 532 and 533 and respective hinge 306 and 307 has an aggregate length which approximates the length of respective first and second hinge 516 and 517. Mirror assembly 531 can optionally include posts 361 for further supporting frame 346 on planar base 301.

Figure 23:
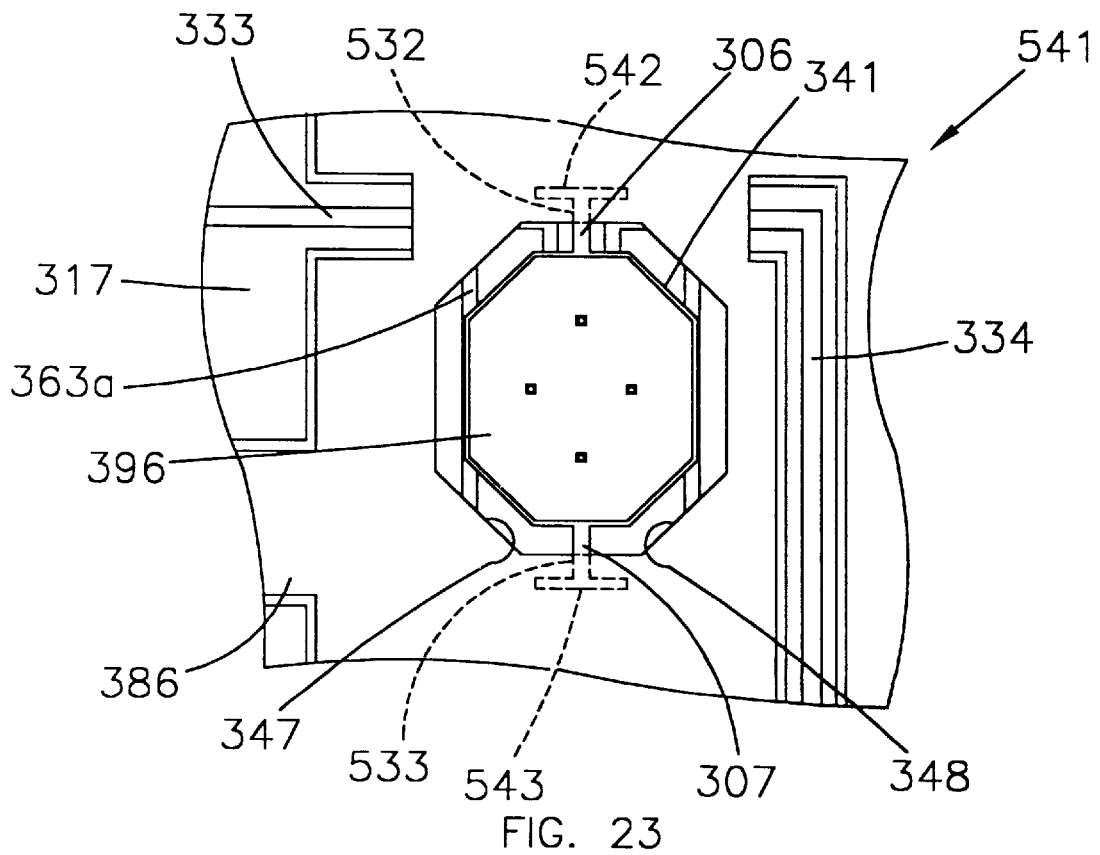
FIG. 23 is a plan view similar to FIG. 21 of yet another embodiment of the micro-machined mirror assembly of the present invention.

In yet a further embodiment of the invention, a mirror assembly 541 is shown in FIG. 23. Mirror assembly 541 is substantially similar to mirror assemblies 200, 506 and 531 and like reference numerals have been used to describe like components of the mirror assemblies 200, 506, 531 and 541.

First and second hinges 306 and 307 serve to pivotally secure the mirror 220 to frame 346. First and second rib clamps 532 and 533 extend from respective first and second hinges 306 and 307. A plurality of posts substantially similar to posts 361 are included in mirror assembly 541. Such posts include first and second posts 542 and 543 extending between plate layer 342 and polysilicon layer 319 in substantially the same manner as posts 361. The posts 542 and 543 each rest on a grounded landing pad (not shown) formed from polysilicon layer 319. The posts 542 and 543 can be formed in substantially the same manner as posts 361 and can be made from the same material as the posts 361.

Posts 542 and 543 are each centered on longitudinal axis 303 and each extend transversely of the axis 303. More specifically, the posts 542 and 543 each have a width extending transversely of axis 303 of approximately 50 microns and a thickness measured along the axis 303 of approximately 15 microns. First rib clamp 532 secures to first post 542 and second rib clamp 533 secures to second post 543. Mirror assembly 541 can optionally include posts 361 and/or first and second braces 521 and 522 and be within the scope of the present invention.

In operation and use, first and second posts 542 and 543 of the mirror assembly 541 provide additional support to first and second rib clamps 532 and 533 and respective first and second hinges 306 and 307 to inhibit undesired vertical bending of hinges 306 and 307 during actuation of mirror 220.

The mirror assemblies hereof can have other configurations of hinge members or hinges and be within the scope of the present invention. In one such alternate embodiment, first and second longitudinally-extending hinges can be provided which are aligned along one side of the mirror so that the mirror pivots about a longitudinal axis disposed on such side of the mirror. Only a single drive electrode disposed beneath the mirror is required. In another such embodiment, first and second hinges extending perpendicular to the longitudinal or rotational axis can be provided. Such hinges can secure to one side of the mirror so as to cause the mirror to cantilevered over the drive electrode.

It should be appreciated that the mirror assemblies of the invention can be formed without ribs 411 or any configuration of ribs. Accordingly, a mirror platform 341 having a peripheral rib, one or more diagonal ribs, a longitudinal rib and/or a transverse rib are within the scope of the invention.

Mirror assembly 200 offers improvements to electrical performance, mechanical integrity, optical quality and fabrication yield and reductions in susceptibility to damage. The laminate structure of dielectric 314, that is silicon nitride layer 317 overlying silicon dioxide layer 316, can provide breakdown voltages in excess of 300 volts. As a result, relatively high voltages can be provided to first and second drive electrodes 322 and 323 for moving mirror 220 relative to frame 346. Several techniques are provided for minimizing surface leakage current between and around the drive electrode 322 and 323. More specifically, silicon nitride layer 317 can be removed between the drive electrodes 322 and 323, the drive electrodes can be substantially surrounded by a grounded guard electrode and/or the drive electrodes can be passivated by encapsulating them with an additional layer of silicon nitride.

Planarization of the top and bottom surfaces 343 and 344 of plate layer 342 is enhanced in mirror assembly 200. As discussed above, thin PSG layer 416 contributes to the planarization of plate layer 342 by minimizing the overall topography of the plate layer 342 during polishing. In addition, localized higher polishing pressures are reduced and undesirable rounding or other nonplanar shaping of layer 426 is inhibited by minimizing the width of the grooves, such as trenches 421 and 422, and other openings formed in PSG layer 417. The width of any feature etched into PSG layer 417 is kept at a minimum, for example between 10–15 microns. Any cusps or other indentations in plate layer 342 resulting from the formation of structural features underlying the plate layer are thus minimized. Planarization of mirror 220 and the other components of plate layer 342 are further enhanced by forming such features at the same height relative to planar base 301. The relatively large surface area of frame 346 and the relatively large planar area of slider attach area 200b also facilitate planarization of plate layer 342. A top surface 343 of optical quality is thus provided.

Techniques for minimizing over polishing into the sacrificial PSG layer 417 are disclosed. As a result, the electrostatic gap between mirror platform 341 and first and second drive electrodes 322 and 323 can be maintained within relatively tight tolerances. Residual stresses in mirror platform 341 and reflective layer 396 are minimized. In this regard, plate layer 342 is preferably annealed for a relatively long time period to reduce undesirable stress gradients, which otherwise can cause cracking, fracture and/or warping of platform.

Ribs 411 are secured to the underside of mirror platform 341 for inhibiting warping or other undesirable nonplanar shaping of the movable mirror 220. A variety of rib configurations are provided in this regard. Peripheral rib 411a further permits mirror 220 to have a quality factor, Q, in the desired range of 3–5. As discussed above, stiffening ribs 411 extend approximately five to six microns into the electrostatic gap, that is the space between the mirror platform 341 and first and second drive electrodes 322 and 323. The inclusion of peripheral rim 411a at the perimeter of the mirror platform 341 severely limits the ability of air beneath the mirror platform to escape during actuation. Thus, peripheral rib 411a serves to increase the magnitude of the squeeze film damping effect, that is damping due to inhibiting the escape of air from beneath the mirror platform 341 during actuation of mirror 220. Peripheral rib 411a additionally compensates for the loss of damping caused by etch release holes 476.

Frame 346 is securely anchored to planar base 301 by posts 361 and walls 371 so as to minimize undesirable bending of the frame 346 or movement of mirror 220. The posts 361 and walls 371 create anchors for mechanically fixing plate layer 342 to planar base 301 and are strategically located to improve the mechanical performance of mirror 220. For example, the four posts 361 provide corner supports to frame 346 for minimizing the bending of the frame that can occur as a result of residual biaxial stress in plate layer 342. The alternative embodiments, namely rib hinges 516 and 517, braces 521 and 522, rib clamps 532 and 533 and posts 542 and 532, improve the resistance of the hinges to unwanted vertical bending when an electrostatic force is is applied to mirror 220.

Grooves 401 extending through plate layer 342 and PSG layer 356 inhibit warping of substrate 311 which may result from the biaxial stress of the relatively thick PSG layer 356. As a result, handling of mirror assemblies 200 during separation of the joined mirror assemblies from each other is made easier.

The octagonally shaped mirror 220 provides for a generally elliptical reflective surface which approximates the shape of the circular laser spot projected onto mirror 220 when the mirror is inclined at 45° to the laser propagation axis. This is an improvement over a rectangular-shaped mirror, the corners of which do not serve any optical purpose and are thus unnecessary. In addition, the reduced lateral dimensions of the octagonally-shaped mirror result in an increase in the stiffness of mirror 220. The octagonally-shaped mirror 220 is a more compact shape than a corresponding rectangular mirror and is a more efficient design with respect to mirror plate stiffness.

The octagonal shape of mirror 220 also provides an advantage in the performance of mirror 220 over a rectangular-shaped mirror of similar design. In general, the maximum deflection angle prior to electrostatic pull-in is a function of the shape of mirror platform 341. Electrostatic pull-in occurs when the electrostatic torque generated by the applied voltage from first drive electrode 322 or second drive electrode 323 on the deflected mirror 220 is greater than the available restoring torque provided by first and second hinges 306 and 307 at such deflection. The resonant frequency is a function of the quotient of the torsional spring constant of hinges 306 and 307 divided by the mass moment of inertia of mirror platform 341 about longitudinal or torsional axis 303. The lack of corners in the octagonally-shaped mirror 220 in comparison to a rectangular-shaped mirror of similar length and width decreases the mass moment of inertia of the mirror and thus advantageously increases the resonant frequency of the mirror at the expense of an increase in the actuation voltage required for a given deflection angle. In this regard, the reduction in surface area at the outer extremities of the mirror platform, that is at areas farthest from rotational axis 303, increases the necessary actuation voltage required to move the mirror 220 to a given deflection angle. However, this marginal increase in actuation voltage required to produce a given deflection angle is further offset by an increase in the maximum deflection angle of the mirror, relative to a rectangular-shaped mirror, permitted prior to electrostatic pull-in. With this improvement in angular range, the resonant frequency and actuation voltage can be adjusted through a design change to first and second hinges so that the combination of the three parameters is better than that provided by a rectangular-shaped mirror.

The placement of contact platforms 381–383 adjacent a side of mirror assembly 200, and specifically at one end of the mirror assembly, simplifies the routing of the mirror drive wires off of flying head 106. Such placement of contact platforms 381–383 permits the wires 113 from controller 112 to be routed directly down arm 105 without the need of wrapping the wires around mirror assembly 200 (see FIG. 2).

The processing methods for mirror assemblies 200 disclosed herein for separating the mirror assemblies from each other facilitate high volume manufacturing of the mirror assemblies. The methods provide for high chip yields by minimizing breakage of mirror 220 and first or second hinges 306 and 307 and minimizing other damage to the mirror assembly. The optional self-assembled monolayer coating reduces the ability of mirror 220 to undesirably stick to planar base 301.

The method of manufacturing and processing micro-machined mirror assemblies described herein are not limited to mirror assemblies for use in magneto-optical data recording and/or retrieval systems. The mirror assemblies manufactured and/or processed by such methods can be used in any suitable data recording and/or retrieval system or for any other purpose.

The optical light emitter and receiver described herein can include a laser source carried by the read and/or write head in close proximity to the mirror assembly. In one such embodiment, the optical light emitter and receiver includes a laser source and one or more suitable polarization sensitive detectors. Such a system may or may not need a fiber optical element to transmit laser beams to or from the mirror assembly. In addition, the mirror assemblies described above can be used in other than a flying MO head. In this regard, application of the micro-machined devices and methods of the present invention are not restricted to magneto-optical data recording and/or retrieval systems. The structures and methods of this invention may also be incorporated in magnetic recording and/or retrieval systems by using the micro-machined mirror assembly as part of optical signal detection apparatus for servo control of slider head location relative to a magnetically recorded track. For example, by optically detecting position related changes of magnetic intensity and magnetic domain transitions.

The micro-machined mirror assembly of the present invention also has application in other non-magnetic media recording and/or retrieval systems. One application is in retrieving optical information from media using physical recording methods (e.g., CD-ROMs having data recorded as physical pits or depressions for reflecting and modulating the phase or intensity of a beam of incident light). The micro-machined mirror assembly of the present invention may also have application in retrieving optical data from media having data storage locations providing optical phase modulation in the absence of magnetic fields.

While the foregoing detailed description has described embodiments of the micro-machined mirror assembly in accordance with this invention, it is to be understood that the above to description is illustrative only and not limiting of the disclosed invention. It will be appreciated that it would be possible to modify the size, shape and appearance and methods of manufacture of various elements of the invention or to include or exclude various elements within the scope and spirit of this invention.

What is claimed is:

1. A method for processing a plurality of mirror assemblies formed together from a silicon wafer having at least one layer of a dielectric material disposed thereon, each of the mirror assemblies being of micron dimensions and for use in a magneto-optical data storage system and having a planar mirror which is spaced apart from the at least one dielectric layer and disposed generally parallel to the at least one dielectric layer, the planar mirror having first and second end portions and a longitudinal axis extending between the first and second end portions, at least a portion of the mirror being of a conductive material, each of the mirror assemblies having first and second hinge members extending along the longitudinal axis and connected to the first and second end portions and means for securing the first and second hinge members to the at least one dielectric layer for permitting the mirror to rock between first and second positions about the longitudinal axis relative to the at least one dielectric layer when operational, each of the mirror assemblies having first and second spaced-apart electrodes carried by the at least one dielectric layer for driving the mirror between the first and second positions during operation, the method comprising the steps of exposing the mirror assemblies to an acid release etch to release the mirror relative to the at least one dielectric layer and thus produce released mirror assemblies, rinsing the released mirror assemblies to produce washed mirror assemblies, drying the washed mirror assemblies to produce dried mirror assemblies, coating the dried mirror assemblies with an organic protectant to produce coated mirror assemblies, mounting the coated mirror assemblies on a mounting tape to produce mounted mirror assemblies, dicing the mounted mirror assemblies to produce a plurality of diced mirror assemblies, removing the organic protectant from the diced mirror assemblies to produce cleaned mirror assemblies and separating the cleaned mirror assemblies from the mounting tape so as to produce discrete mirror assemblies.

2. The method of claim 1 wherein the organic protectant is a photoresist and wherein the removing step includes the step of removing the photoresist with a solvent.

3. The method of claim 2 wherein the solvent is acetone and wherein the removing step includes the step of washing the acetone from the diced mirror assemblies with isopropanol.

4. The method of claim 2 wherein the coating step includes the step of coating the dried mirror assemblies with photoresist number AZ1813 sold by Hoechst Celanese of Dallas, Tex.

5. The method of claim 1 wherein the organic protectant is a photoresist and wherein the removing step includes the step of removing the photoresist by means of a plasma etch.

6. The method of claim 1 wherein the mounting tape is a heat release tape.

7. The method of claim 6 wherein the separating step includes heating the cleaned mirror assemblies to 100° C. to release the cleaned mirror assemblies from the heat release tape.

8. The method of claim 1 wherein the mounting tape is Revalpha Tape No. 3195 sold by Nitto Denko of Osaka, Japan.

9. The method of claim 1 wherein the mounting tape is Revalpha Tape No. 3198 sold by Nitto Denko of Osaka, Japan.

10. The method of claim 1 wherein the dicing step includes the step of dicing the mounted mirror assemblies with a semiconductor industry dicing saw.

11. The method of claim 1 further comprising the step of sorting the discrete mirror assemblies and placing the discrete mirror assemblies in a tray.

12. The method of claim 1 wherein the drying step includes drying the washed mirror assemblies with a nitrogen gun and then in an oven at 90° C. for a time period ranging from 5 to 10 minutes.

13. A method for processing a plurality of mirror assemblies formed together from a silicon wafer having at least one layer of a dielectric material disposed thereon, each of the mirror assemblies being of micron dimensions and for use in a magneto-optical data storage system and having a planar mirror which is spaced apart from the at least one dielectric layer and disposed generally parallel to the at least one dielectric layer, the planar mirror having first and second end portions and a longitudinal axis extending between the first and second end portions, at least a portion of the mirror being of a conductive material, each of the mirror assemblies having first and second hinge members extending along the longitudinal axis and connected to the first and second end portions and means for securing the first and second hinge members to the at least one dielectric layer for permitting the mirror to rock between first and second positions about the longitudinal axis relative to the at least one dielectric layer when operational, each of the mirror assemblies having first and second spaced-apart electrodes carried by the at least one dielectric layer for driving the mirror between the first and second positions during operation, the method comprising the steps of coating the mirror assemblies with an organic protectant to produce coated mirror assemblies, mounting the coated mirror assemblies on a mounting tape to produce mounted mirror assemblies, dicing the mounted mirror assemblies to produce a plurality of diced mirror assemblies, removing the organic protectant from the diced mirror assemblies to produce cleaned mirror assemblies, exposing the cleaned mirror assemblies to an acid release etch to produce released mirror assemblies, rinsing the released mirror assemblies to produce washed mirror assemblies, drying the washed mirror assemblies to produce dried mirror assemblies and separating the dried mirror assemblies from the mounting tape so as to produce discrete mirror assemblies.

14. The method of claim 13 wherein the dicing step includes the step of dicing the mounted mirror assemblies with a semiconductor industry dicing saw.

15. The method of claim 13 wherein the drying step includes drying the washed mirror assemblies with a nitrogen gun and then in an oven at 90° C. for a time period ranging from 5 to 10 minutes.

16. The method of claim 13 wherein the mounting tape is a heat release tape and wherein the separating step includes heating the dried mirror assemblies to 100° C. to release the dried mirror assemblies from the heat release tape.

17. The method of claim 13 further comprising the step of coating the released mirror assemblies with a self-assembled monolayer coating prior to the rinsing step.

18. The method of claim 13 wherein the organic protectant is a photoresist.

19. A method for processing a plurality of mirror assemblies formed together from a silicon wafer having at least one layer of a dielectric material disposed thereon, each of the mirror assemblies being of micron dimensions and for use in a magneto-optical data storage system and having a planar mirror which is spaced apart from the at least one dielectric layer and disposed generally parallel to the at least one dielectric layer, the planar mirror having first and second end portions and a longitudinal axis extending between the first and second end portions, at least a portion of the mirror being of a conductive material, each of the mirror assemblies having first and second hinge members extending along the longitudinal axis and connected to the first and second end portions and means for securing the first and second hinge members to the at least one dielectric layer for permitting the mirror to rock between first and second positions about the longitudinal axis relative to the at least one dielectric layer when operational, each of the mirror assemblies having first and second spaced-apart electrodes carried by the at least one dielectric layer for driving the mirror between the first and second positions during operation, the method comprising the steps of exposing the mirror assemblies to an acid release etch to produce released mirror assemblies, rinsing the released mirror assemblies to produce washed mirror assemblies, drying the washed mirror assemblies to produce dried mirror assemblies, mounting the dried mirror assemblies onto a mounting tape to produce mounted mirror assemblies, scribing and breaking the mounted mirror assemblies to produce a plurality of scribed mirror assemblies and separating the scribed mirror assemblies from the mounting tape so as to produce discrete mirror assemblies.

20. The method of claim 19 wherein the acid is hydrofluoric acid.

21. The method of claim 19 further comprising the step of coating the released mirror assemblies with a self-assembled monolayer coating prior to the rinsing step.

22. The method of claim 19 wherein the mounting tape is a heat release tape.

23. The method of claim 19 wherein the rinsing step includes rinsing the released mirror assemblies in water.

* * * * *